(12) United States Patent
Ogawa et al.

(10) Patent No.: US 7,802,270 B2
(45) Date of Patent: Sep. 21, 2010

(54) DISK REPRODUCING APPARATUS

(75) Inventors: Kouichi Ogawa, Kobe (JP); Susumu Yamamoto, Kobe (JP); Takayuki Umemoto, Kobe (JP); Takeshi Fujii, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 824 days.

(21) Appl. No.: 11/653,318

(22) Filed: Jan. 16, 2007

(65) Prior Publication Data

US 2007/0169140 A1 Jul. 19, 2007

(30) Foreign Application Priority Data

Jan. 16, 2006 (JP) ............................ P2006-008090

(51) Int. Cl.
*G11B 17/028* (2006.01)
(52) U.S. Cl. ...................................... 720/706
(58) Field of Classification Search ................ None
See application file for complete search history.

(56) References Cited

U.S. PATENT DOCUMENTS

| | | | |
|---|---|---|---|
| 4,799,209 A | 1/1989 | Grobben | |
| 4,855,990 A | 8/1989 | Akiyama | |
| 6,577,586 B1 | 6/2003 | Yang et al. | |
| 6,928,045 B2* | 8/2005 | Eum et al. | 369/270.1 |
| 6,931,653 B2* | 8/2005 | Kuo | 720/714 |
| 7,107,603 B2* | 9/2006 | Tuchiya | 720/713 |
| 7,225,449 B2* | 5/2007 | Pan | 720/604 |
| 7,305,686 B2* | 12/2007 | Kim | 720/626 |
| 7,533,395 B2* | 5/2009 | Araki et al. | 720/712 |
| 2003/0133398 A1 | 7/2003 | Shishido | |
| 2004/0250269 A1* | 12/2004 | Pan | 720/604 |
| 2005/0005280 A1* | 1/2005 | You | 720/659 |
| 2006/0085806 A1* | 4/2006 | Lin | 720/619 |
| 2007/0079310 A1* | 4/2007 | Araki et al. | 720/605 |

FOREIGN PATENT DOCUMENTS

| | | |
|---|---|---|
| CN | 1281218 | 1/2001 |
| CN | 1427405 | 7/2003 |
| JP | A-62-209763 | 9/1987 |
| JP | A-63-34764 | 2/1988 |
| JP | 06-044658 | 2/1994 |

(Continued)

OTHER PUBLICATIONS

Office Action for corresponding Korean Application No. 2007-0004570 dated Jan. 31, 2008.

(Continued)

*Primary Examiner*—Mark Blouin
(74) *Attorney, Agent, or Firm*—Harness, Dickey & Pierce, P.L.C.

(57) ABSTRACT

A disk reproducing apparatus with improved quality is provided which has a clamper and a clamper plate. By providing the clamp plate with connection portions radially extending from a radially inner peripheral portion toward radially outer peripheral portion of the clamp plate, the axial displacement relative to a clamp holder can be increased as compared to that in the existing structure. Moreover, by disposing the clamper on the radially inner peripheral portion of the clamp plate so as to be elastically deformable, the spacing in clamping can be increased to a drive part.

13 Claims, 23 Drawing Sheets

FOREIGN PATENT DOCUMENTS

| | | |
|---|---|---|
| JP | A-08-007425 | 1/1996 |
| JP | 09-017081 | 1/1997 |
| JP | A-11-03553 | 1/1999 |
| JP | A-2000-036149 | 2/2000 |
| JP | A-2001-357583 | 12/2001 |
| JP | A-2001-357584 | 12/2001 |
| JP | 2002-288907 | 10/2002 |
| JP | A-2002-358706 | 12/2002 |
| JP | A-2002-373465 | 12/2002 |
| JP | 2003-173597 | 6/2003 |
| JP | A-2003-187510 | 7/2003 |
| JP | 2004-220666 | 8/2004 |
| JP | 2005-025838 | 1/2005 |
| JP | A-2005-122857 | 5/2005 |
| WO | WO 2005/038793 A1 | 4/2005 |

OTHER PUBLICATIONS

Notification of Reason for Refusal from the Chinese Patent Office dated Apr. 4, 2008 with regard to corresponding Chinese Patent Application No. 200710001753.4.

Notification or Reasons for Refusal from the Japanese Patent Office dated Nov. 4, 2008 corresponding to Japanese Patent Application No. 2006-008090.

* cited by examiner

DISK REPRODUCING APPARATUS

BACKGROUND OF THE INVENTION

1. Field of the Invention

The present invention relates to a disk reproducing apparatus and a clamp structure thereof, and more particularly to a disk reproducing apparatus for vehicle mounting use and a technique suitable for use in a vehicle-mounted disk reproducing apparatus.

2. Description of the Related Art

For electronic apparatuses, there is a practical art concerning a clamp structure to hold and clamp a recording disk upon a drive part of a spindle motor (see Japanese Unexamined Patent Publication JP-A 6-44658 (1994), for example). By placing a clamp holder from a spaced state into proximate state relative to the drive part, the recording disk is to be clamped.

In the existing art, because the clamp structure entirety is highly rigid, spacing cannot be given fully to the drive part of the spindle motor. Therefore, there are cases not compatible with a recording disk greater in thickness than the existing recording disk. Where the recording disk is greater in thickness or so-called wavy in form less flat, the disk might be inserted or ejected unsuccessfully.

SUMMARY OF THE INVENTION

It is an object of the invention to provide a disk reproducing apparatus with improved quality, and a clamp structure thereof.

The invention provides a disk reproducing apparatus comprising:

a clamper which is elastically deformable and presses a disk against a turntable; and a clamp plate composed of a fixed portion fixed to a clamp holder, a contact portion in contact with the clamper, and a connection portion which is elastically deformable and connects the fixed portion and the contact portion.

According to the invention, by placing the clamp holder from a spaced state into a proximate state relative to the drive part, a clamper acts to clamp the recording disk cooperatively with a turntable. A clamp plate has a connection portion which is elastically deformable, thus causing the clamper to be ready to deflect.

With the invention, the clamp plate has the connection portion, whereby the spacing in clamping to the drive part can be provided to a possible great extent, thus coping with a recording disk in different thickness.

In the invention, it is preferable that the connection portion radially extends from the contact portion to the fixed portion.

According to the invention, the clamp plate has the connection portion which extends radially, thus providing an axial displacement, relative to the clamp holder, greater as compared to that in the existing structure, whereby the spacing in clamping to the drive part can be provided to a possible great extent, thus coping with a recording disk in different thickness.

In the invention, it is preferable that the clamper is formed of a flexible material so as to have a circular shape, and is provided with an annular slant wall portion formed so as to be closer to the turntable from inside to outside in a radial direction of the clamper, and a deflection amount of the clamper relative to the clamp holder is determined depending upon a thickness of the slant wall portion.

According to the invention, the clamper is provided with an annular slant wall made closer to the drive part from inside to outside in a radial direction of the clamper. Depending upon the wall thickness of the slant wall, determined is a deflection amount of the clamper relative to the clamp holder. Where the clamper is desirably deflected further, the slant wall is reduced in wall thickness. Where the clamper is desirably suppressed in deflection, the slant wall is increased in wall thickness.

Since, a deflection amount of the clamper can be determined relative to the clamp holder depending upon the wall thickness of the slant wall, in the case where the clamper is desirably deflected further, the slant wall is reduced in wall thickness and in the case where the clamper is desirably suppressed in deflection, the slant wall is increased in wall thickness. Thus, a recording disk greater in thickness can be coped with, making it possible to raise the versatility of the electronic apparatus.

In the invention, it is preferable that the clamp holder is provided with a pair of detaching means which detaches a recording disk from the turntable and which are arranged in positions symmetric or nearly symmetric about an axis of the turntable.

According to the invention, by placing the clamp holder in a spaced state from the drive part, the recording disk can be detached from the drive part by means of one pair of detaching means. Because the detaching means are arranged in positions symmetric or nearly symmetric about the axis of the drive part, the recording disk when removed from the drive part can be detached smoothly without inclining the recording disk relative to the clamp holder.

With the invention, because one pair of detaching means are arranged in positions symmetric or nearly symmetric about the axis of the drive part, the recording disk when removed from the drive part can be smoothly detached from the drive part without inclining the recording disk relative to the clamp holder. Even where the recording disk is tightly held on the drive part, the recording disk can be detached from the drive part smoothly and positively.

In the invention, it is preferable that the disk reproducing apparatus further comprises:

a chassis body which houses electronic components; and a chassis cover for covering the chassis body, wherein the chassis cover has a reinforcing rib which is disposed on the chassis cover at a lengthwise intermediate portion of its outer peripheral edge and can be engaged with the chassis body.

According to the invention, a reinforcing rib is disposed on a chassis cover at a lengthwise intermediate portion of an outer peripheral edge thereof. Part of the reinforcing rib is structured engageable with a chassis body. In other words, when the chassis body is covered with the chassis cover, the reinforcing rib in its part is engaged with the chassis body.

With the invention, because the reinforcing rib is disposed on the chassis cover at a lengthwise intermediate portion of the outer peripheral edge thereof, the chassis cover can be improved in rigidity. Moreover, when the reinforcing rib is partly engageably structured with the chassis body, i.e. when the chassis body is covered with the chassis cover, the reinforcing rib is partly engaged with the chassis body. Thus, the flatness of the chassis cover can be kept within a prescribed value range, favorably maintaining the slidability of a slide component, e.g. a detecting lever.

In the invention, it is preferable that the disk reproducing apparatus further comprises a drive mechanism for driving an optical pickup apparatus, wherein the driving mechanism has:

a feed screw which is structured with a feed-screw pitch capable of reducing a rotational rate of a rotational drive source; and a feed female screw which is in mesh with the feed screw and formed of resin.

According to the invention, the rotation rate of the rotational drive source can be reduced by a feed screw, thus reducing noise rather than that in the existing art. A feed female screw, meshing with the feed screw, is formed of resin and hence can be improved in dimensional accuracy as compared to the existing feed female screw formed by pressing, thus making it possible to place the feed screw and the feed female screw on the pitch line. Accordingly, noise can be reduced rather than in the existing art.

In the invention, it is preferable that a cover member is removably disposed in a vicinity of the feed screw in at least one of the chassis body and the electronic component.

According to the invention, in at least one of the chassis body and the electronic component, a cover member is removably disposed in the vicinity of the feed screw to cover a drive mechanism of the electronic component. Accordingly, in the event of a trouble occurrence in the cover member, the cover member only can be exchanged simply and swiftly. Accordingly, there is eliminated the possibility to damp the electronic apparatus resulting from a trouble in the cover member, thus improving the yield.

In the invention, it is preferable that the rotational drive source and the driving mechanism are structured so that their inclination angles relative to a recording disk can be adjusted, respectively.

With the invention, the inclination angle of the rotational drive source can be adjusted relative to the recording disk, thereby adjusting the inclination angle of the drive mechanism relative to the recording disk. By adjusting the inclination angle of the rotational drive source, skew adjustment accuracy can be improved for an inner peripheral portion of the recording disk. By adjusting the inclination angle of the drive mechanism, skew adjustment accuracy can be improved for an outer peripheral portion of the recording disk. Accordingly, skew adjustment accuracy can be improved for the entirety.

In the invention, it is preferable that the disk reproducing apparatus further comprises:

a guide holder for inserting and ejecting the recording disk; and a spacer formed of resin, which is removably disposed on the guide holder.

According to the invention, the recording disk is inserted and ejected by use of a guide holder. A spacer is formed of resin and removably disposed on the guide holder. Namely, because the spacer can be provided separately from the guide holder, metal-die cost can be reduced. Accordingly, manufacture cost can be reduced for the disk reproducing apparatus. In addition, the spacer can be easily design-changed, which makes it possible to easily exchange the spacer for the guide holder.

In the invention, it is preferable that the spacer is made in a snap-fit structure allowing a deformation due to a difference in thermal expansion coefficient from the guide holder.

According to the invention, because the spacer is made in a snap-fit structure allowing a deformation due to the difference in thermal expansion coefficient from the guide holder, assembling can be simplified as compared to the structure using tightening elements, such as bolts and nuts. Particularly, because the spacer allows a deformation due to the difference in thermal expansion coefficient from the guide holder, thermal resistance can be improved. Accordingly, the temperature conditions the guide holder and the spacer are applicable can be provided strict, thus enhancing the versatility and endurance.

BRIEF DESCRIPTION OF THE DRAWINGS

Other and further objects, features, and advantages of the invention will be more explicit from the following detailed description taken with reference to the drawings wherein:

FIGS. 3A, 3B, 3C and 3D are perspective views showing a comparison between chassis structures, wherein FIG. 3A is a perspective view showing an engagement relationship of between a reinforcing rib of the chassis cover according to the embodiment and a chassis body, FIG. 3B is a perspective view showing an essential part of a chassis structure in the existing structure, FIG. 3C is a perspective view on an enlarged scale of a portion shown in FIG. 3A, and FIG. 3D is a perspective view on an enlarged scale of a portion shown in FIG. 3B;

FIGS. 6A and 6B are perspective views showing a comparison between clamp structures, wherein FIG. 6A is a perspective view showing the clamp plate, etc. according to the present embodiment while FIG. 6B is a perspective view showing a clamp plate, etc. according to the existing structure;

FIGS. 7A and 7B are perspective views showing a comparison between the clamp structures, wherein FIG. 7A is a perspective view showing a relationship between the clamper according to the present embodiment and the drive part for the spindle motor while FIG. 7B is a perspective view showing a relationship between a clamper, etc. according to the existing structure and a drive part for a spindle motor;

FIGS. 8A and 8B are views showing a comparison between insertion/ejection mechanism, wherein FIG. 8A is a view showing a loading motor, motor holder and gear arrangement according to the present embodiment while FIG. 8B is a view showing a loading motor, motor holder and gear arrangement according to the existing structure;

FIGS. 9A, 9B, 9C and 9D are views showing a comparison between the feed mechanisms and skew adjustment mechanisms for the optical pickups, wherein FIGS. 9A and 9C are views showing a feed mechanism and skew adjustment mechanism according to the present embodiment while FIGS. 9B and 9D are views showing a feed mechanism and skew adjustment mechanism according to the existing structure;

FIGS. 26A and 26B show an anti-vibration structure in the electronic apparatus, wherein FIG. 26A shows an anti-vibration structure according to the present embodiment having four oil dampers on the chassis body while FIG. 26B shows an anti-vibration structure according to the existing structure having three oil dampers on the chassis body; and FIGS. 27A, 27B and 27C are views showing a state having floating springs at four points, wherein FIGS. 27B and 27C are enlarged views respectively of a portion shown in FIG. 27A.

DETAILED DESCRIPTION

Figure 1:
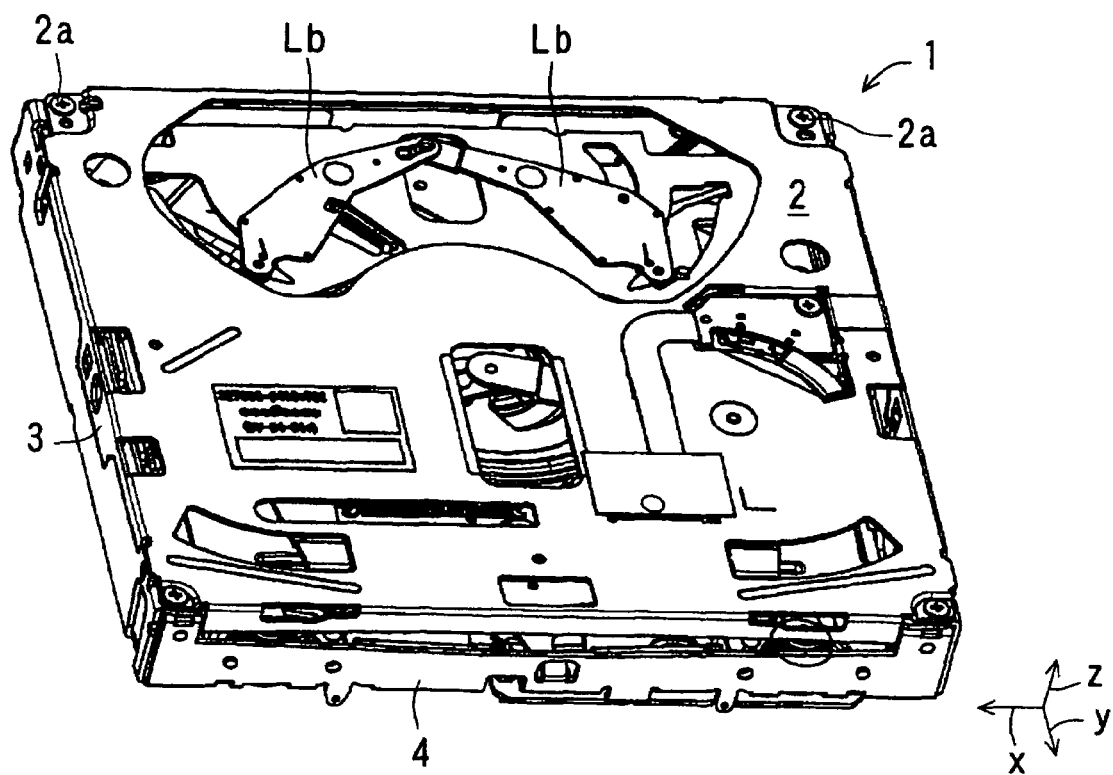
FIG. 1 is a perspective view of an electronic apparatus according to an embodiment of the invention.

Now referring to the drawings, preferred embodiments of the invention are described below.

Figure 2:
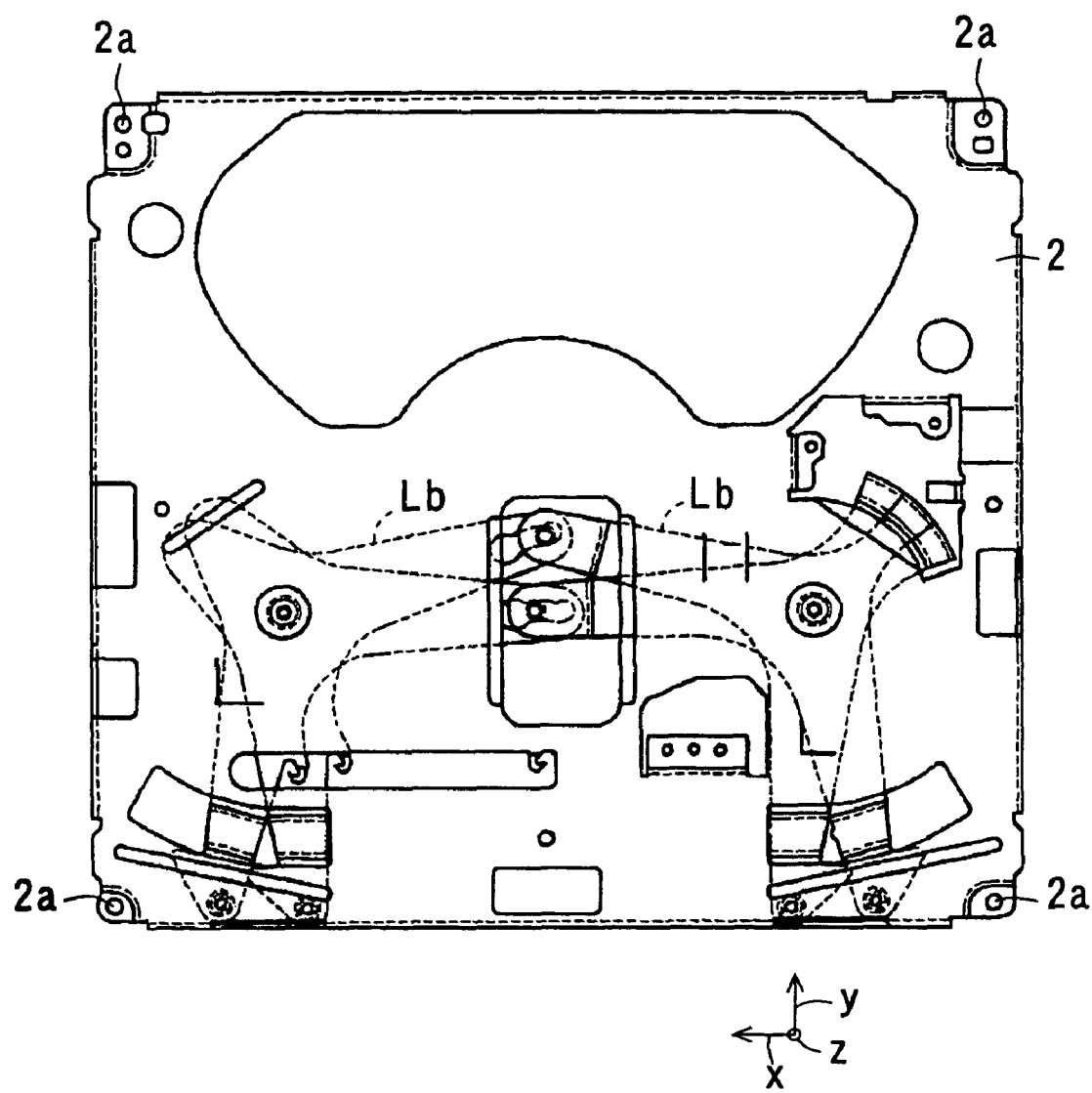
FIG. 2 is a front view of a chassis cover.
Figure 3B:
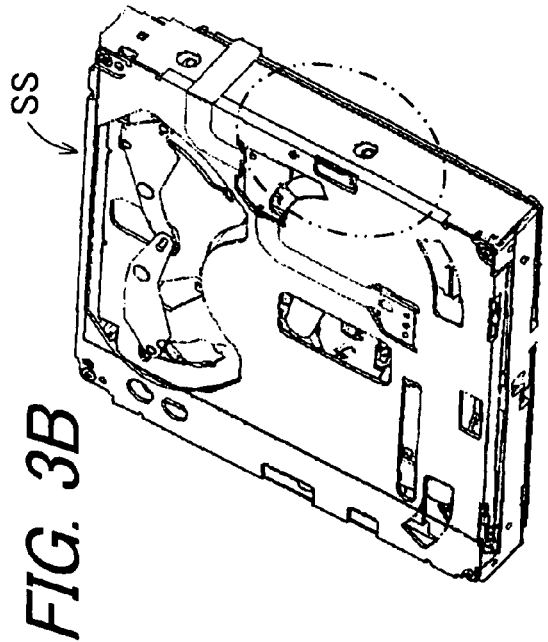
Figure 3D:
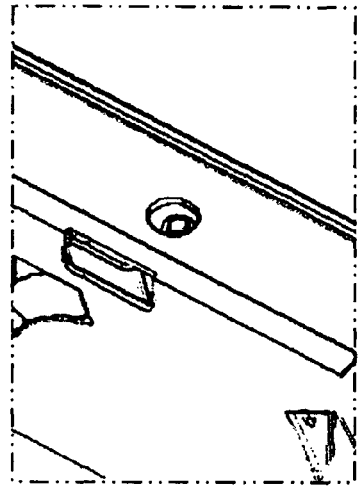
Figure 3A:
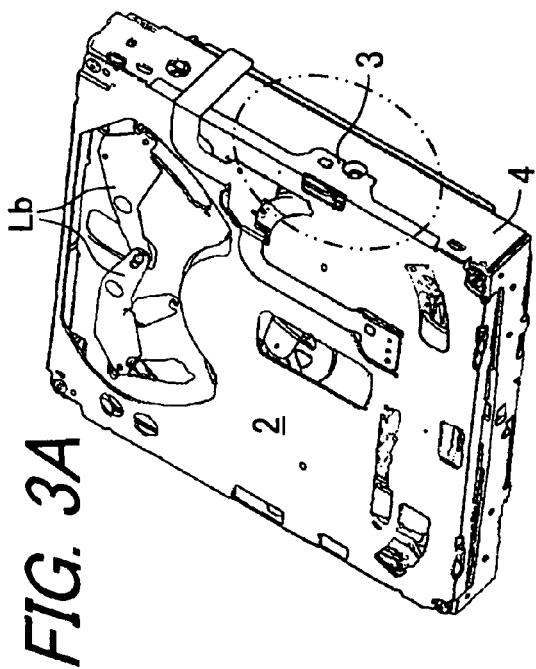
Figure 3C:
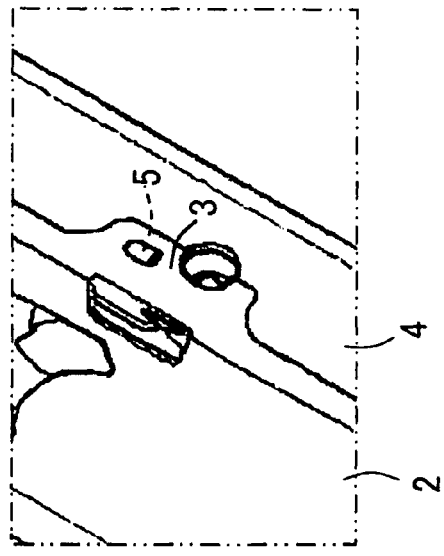

FIG. 1 is a perspective view of an electronic apparatus 1 according to an embodiment of the invention. FIG. 2 is a front view of a chassis cover 2. FIGS. 3A, 3B, 3C and 3D are perspective views showing a comparison between chassis structures, wherein FIG. 3A is a perspective view showing an engagement relationship of between a reinforcing rib 3 of the chassis cover 2 according to the embodiment and a chassis body 4, FIG. 3B is a perspective view showing an essential part of a chassis structure SS in the existing structure, FIG. 3C is a perspective view on an enlarged scale of a portion shown in FIG. 3A, and FIG. 3D is a perspective view on an enlarged scale of a portion shown in FIG. 3B. The electronic apparatus 1 in the embodiment is applicable for a vehicle. However, without limited to vehicular use, application is possible also for a desktop or portable electronic apparatus other than vehicular use.

The electronic apparatus 1 is an electronic apparatus including a spindle motor or the like that is driven to rotate in order to perform any one of reproducing, recording and erasure of a recording disk. The electronic apparatus 1 is thus a so-called a disk reproducing apparatus. The electronic apparatus 1 includes the chassis body 4, the chassis cover 2 covering the chassis body 4, and a plurality of electronic components. A plurality of electronic components are received in the chassis body 4 and covered with the chassis cover 2. It is defined to explain that x direction is taken lengthwise of the chassis cover 2, y direction is transverse thereto, and z direction is orthogonal to the x and y directions. In FIG. 1, x, y and z directions are respectively denoted with arrows x, y and z.

Screw holes 2a are formed in four corners of the chassis cover 2, to firmly fix the chassis cover 2 on the chassis body 4. The reinforcing rib 3, projecting a small distance in the z direction, is arranged in an outer peripheral edge of the chassis cover 2 in a position nearly central (intermediate portion) with respect to the y direction. The reinforcing rib 3 is formed along a y-z plane. The chassis body 4 is arranged with an engager 5 to engagement with a part of the reinforcing rib 3.

Because the reinforcing rib 3 is arranged in the outer peripheral edge of the chassis cover 2 in a position nearly central with respect to the y direction, the chassis cover 2 can be improved in rigidity. Moreover, because part of the reinforcing rib 3 is structured engageable with the engager 5 of the chassis body 4, i.e. part of the reinforcing rib 3 engages with the chassis body 4 when covering the chassis cover 2 over the chassis body 4, the chassis cover 4 can be suppressed in flatness within a prescribed value range, thus maintaining well the slidability of sliding components, such as recording-disk detection levers Lb, as shown in FIG. 2. Meanwhile, impact resistance can be improved rather than in the existing structure. In this manner, the electronic apparatus 1 can be improved in quality. Although the reinforcing rib 3 in this embodiment is arranged in the outer peripheral edge in a position nearly central with respect to the y direction, it may be disposed in the outer peripheral edge in a position nearly central with respect to the x direction. In such a case, the chassis cover 2 can be further improved in rigidity.

Figure 4:
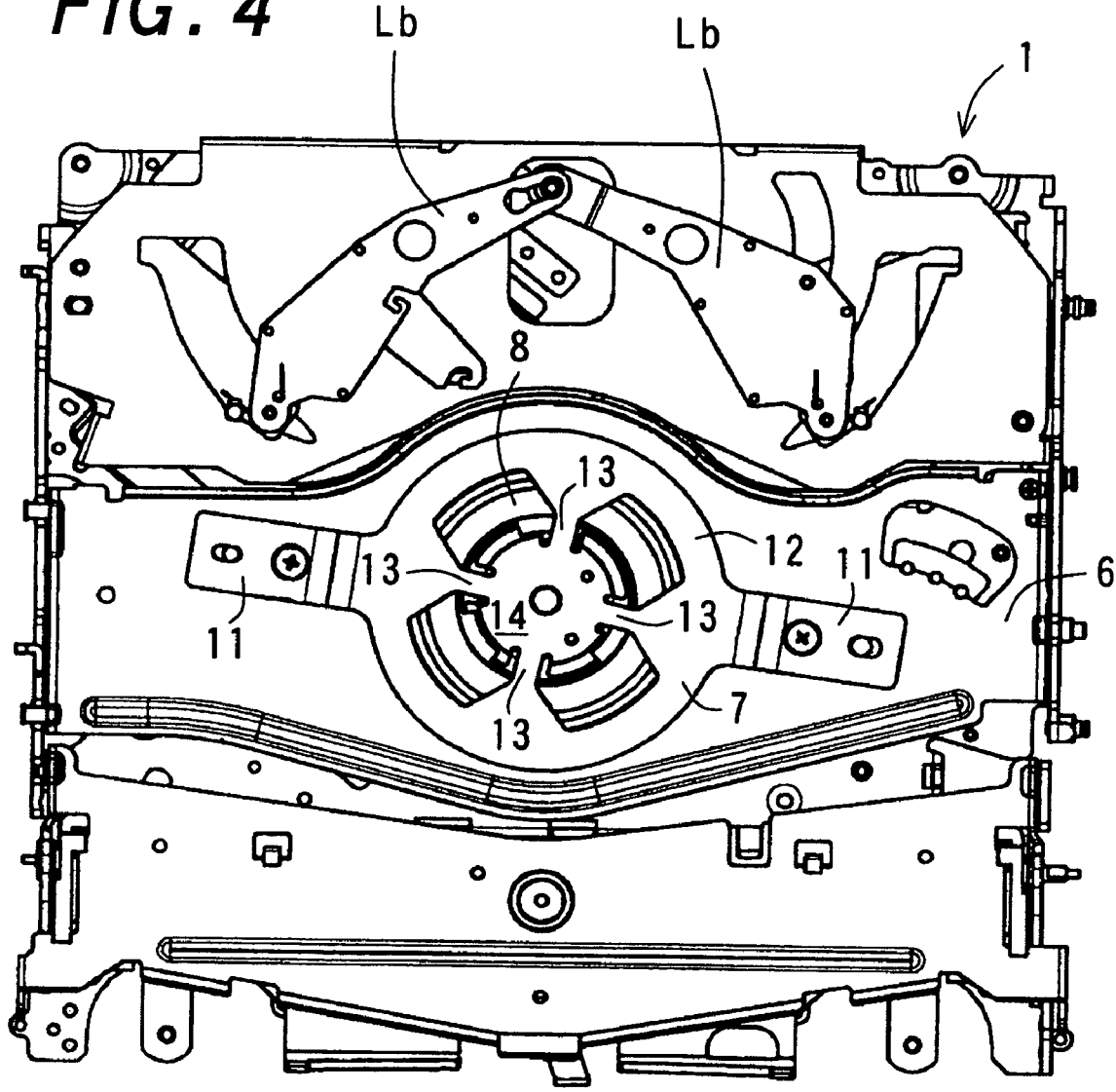
FIG. 4 is a plan view showing a clamp structure of the electronic apparatus.
Figure 5:
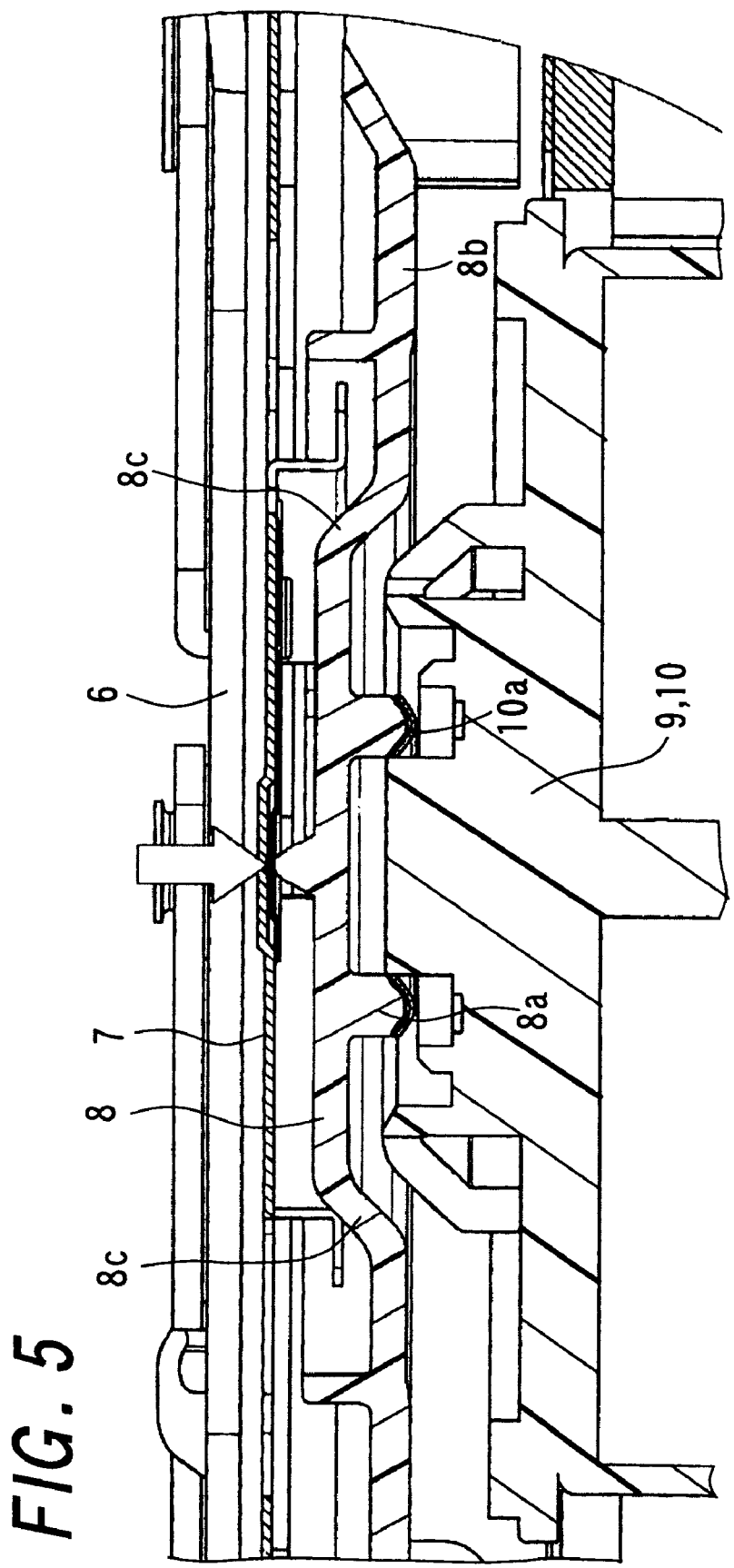
FIG. 5 is a sectional view showing a relationship between a clamp holder, clamp plate and clamper and a drive part of a spindle motor.
Figure 6A:
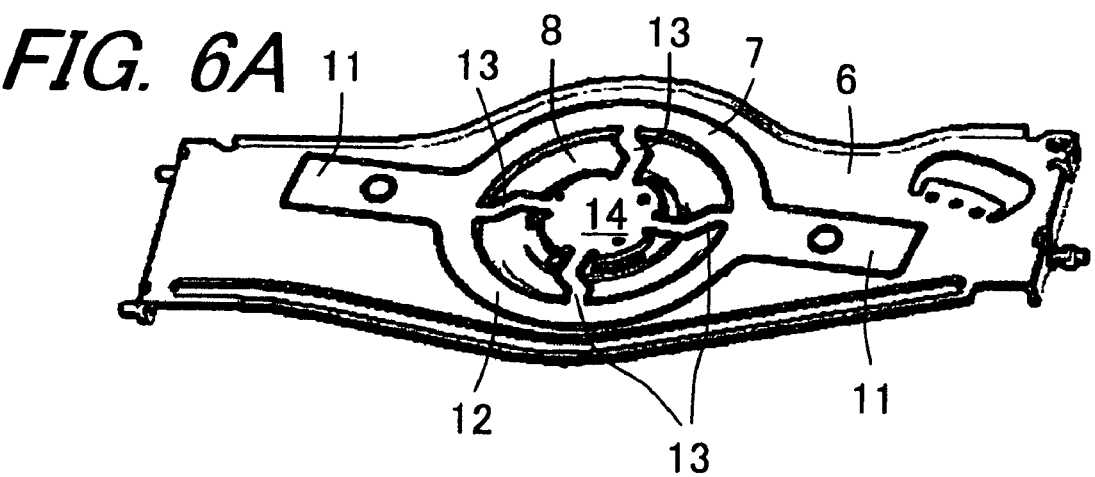
Figure 6B:
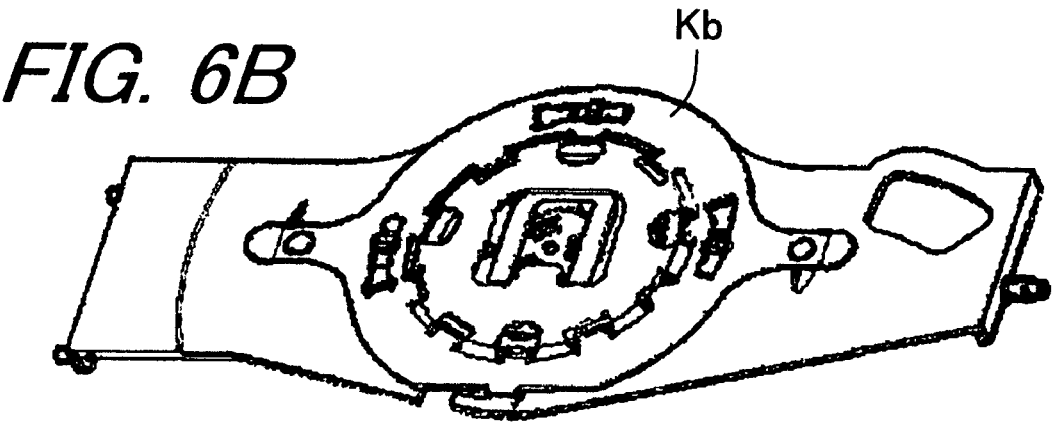
Figure 7A:
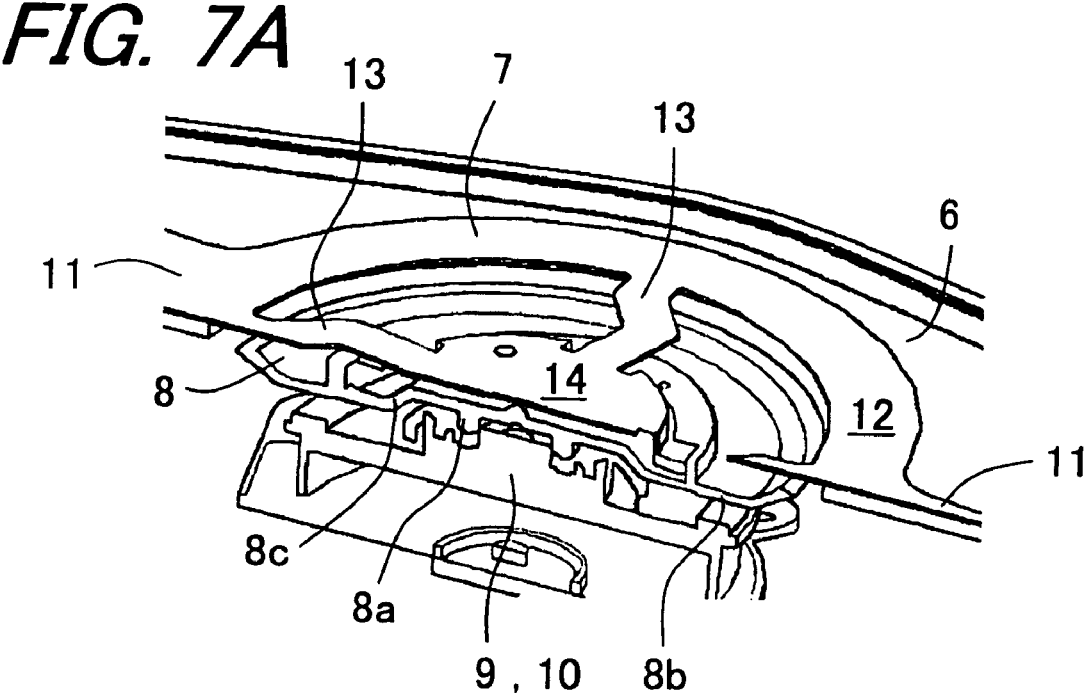
Figure 7B:
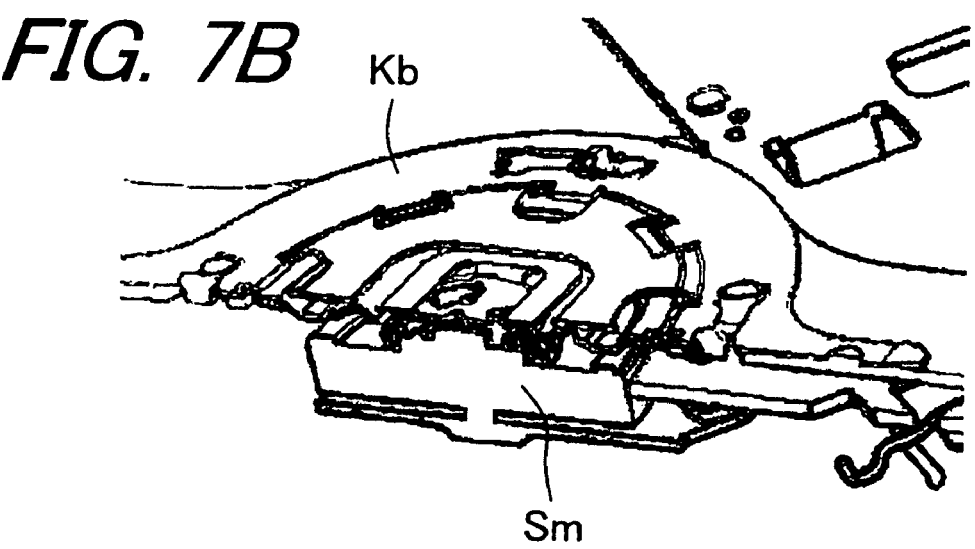

FIG. 4 is a plan view showing a clamp structure of the electronic apparatus 1. FIG. 5 is a sectional view showing a relationship between a clamp holder 6, clamp plate 7 and clamper 8 and a drive part 10 of a spindle motor 9. FIGS. 6A and 6B are perspective views showing a comparison between clamp structures, wherein FIG. 6A is a perspective view showing the clamp plate 7, etc. according to the present embodiment while FIG. 6B is a perspective view showing a clamp plate Kb, etc. according to the existing structure. FIGS. 7A and 7B are perspective views showing a comparison between the clamp structures, wherein FIG. 7A is a perspective view showing a relationship between the clamper 8 according to the present embodiment and the drive part 10 for the spindle motor 9 while FIG. 7B is a perspective view showing a relationship between a clamper, etc. according to the existing structure and a drive part for a spindle motor Sm.

The clamp structure is to support a recording disk on the drive part 10 for the spindle motor 9, which has mainly a clamp holder 6, the clamp plate 7 and the clamper 8. The clamp holder 6 is to support the clamp plate 7 and clamper 8, which is made by a steel plate, for example, and arranged to move toward and away from the drive part 10 which is a turntable. The clamp plate 7 is firmly fixed to the clamp holder 6, thus serving to support the clamper 8. The clamp plate 7 includes a pair of brackets 11, a radially outer portion 12, connection portions 13 and a radially inner peripheral portion 14, that are formed integral by stainless steel plates. The brackets 11 and the radially outer peripheral portion 12 are fixed portions while the radially inner peripheral portion 14 is a contact portion.

In a lengthwise intermediate portion of the clamp holder 6, a hole is formed to displace the clamp plate 7 at its radially inner peripheral portion 14 axially of the drive part 10. One of the brackets 11 extends in one direction from the radially outer peripheral portion 12 toward the radially outward while the other of the brackets 11 extends in the other direction from the radially outer peripheral portion 12 toward the radially outward, both of which are secured to the clamp holder 6. The connection portions 13 are continuously provided radially extending from the radially inner peripheral portion 14 toward the radially outer peripheral portion 12.

The clamper 8 is to clamp a recording disk cooperatively with the drive part 10. The clamper 8 is formed of flexible synthetic resin so as to have a circular shape and is elastically disposed on the radially inner peripheral portion 14 of the clamp plate 7. The clamper 8 has an annular convex portion

8a formed radially inward and to be received in an annular concave 10a of the drive part 10, a flat portion 8b formed radially outward and to press the recording disk, and a slant wall portion 8c formed intermediately between the flat portion 8b and the annular convex portion 8a in such a manner as to be closer to the drive part 10 from inside to outside in a radial direction of the clamper 8. Depending upon a thickness of the slant wall portion 8c, determined is a deflection amount of the clamper 8 relative to the clamp holder 6.

The clamp plate 7 has connection portions 13 radially extending from the radially inner peripheral portion 14 to the radially outer peripheral portion 12 thereby providing an axial shift relative to the clamp holder 6 greater as compared to that in the existing structure. Moreover, the clamper 8 is disposed on the radially inner peripheral portion 14 of the clamp plate 7 to be elastically deformable, thus making it possible to provide an utmost spacing of the clamper 8 from the drive part 10 and hence cope with a recording disk different in thickness. Meanwhile, the deflection amount of the clamper 8 relative to the clamp holder 6 can be determined depending upon the wall thickness of the slant wall portion 8c. Where desirably deflecting the clamper 8 greatly, the slant wall portion 8c is reduced in wall thickness. Where desirably suppress the deflection of the clamper 8, the slant wall portion 8c is increased in wall thickness. Accordingly, a thick recording disk can be coped with thus enhancing the versatility of the electronic apparatus 1.

Figure 8A:
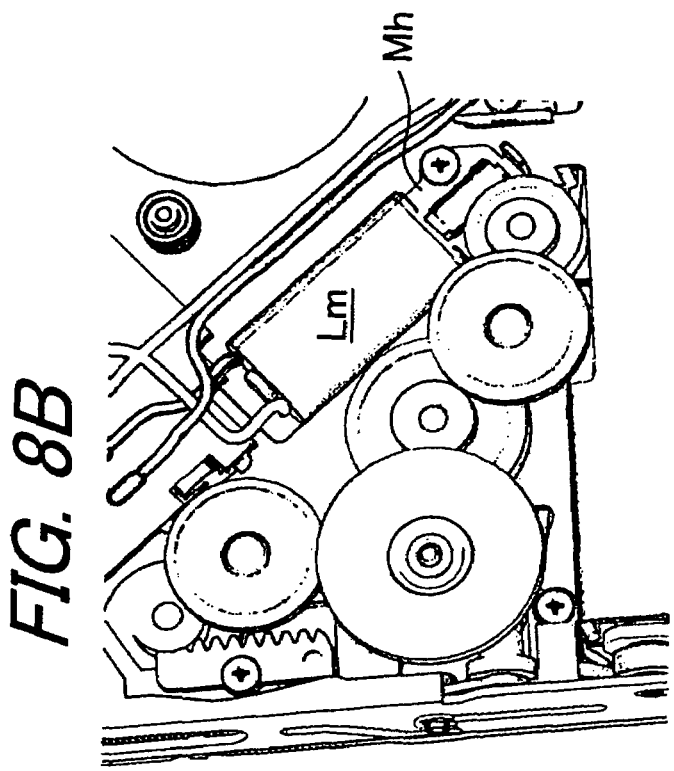
Figure 8B:
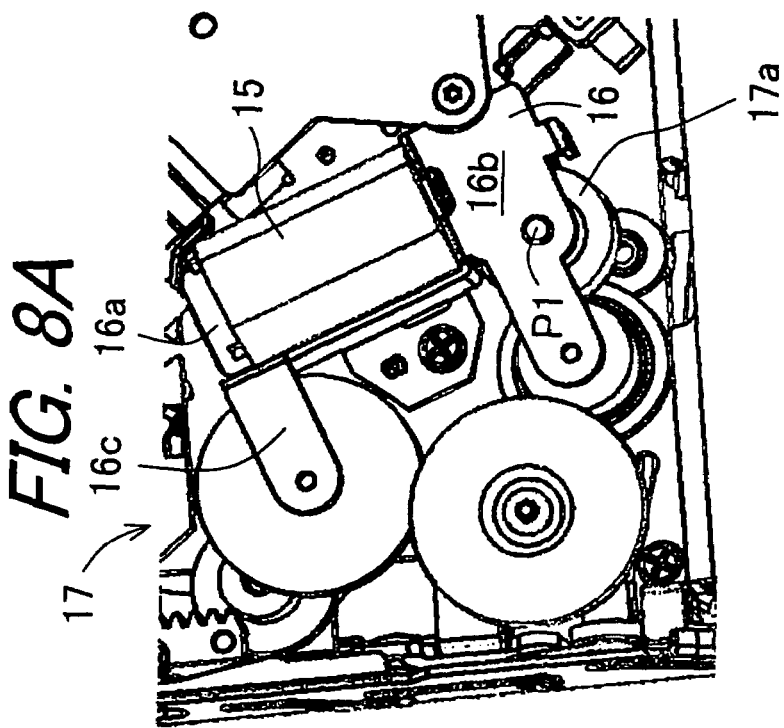

FIGS. 8A and 8B are views showing a comparison between insertion/ejection mechanism, wherein FIG. 8A is a view showing a loading motor 15, motor holder 16 and gear arrangement according to the present embodiment while FIG. 8B is a view showing a loading motor Lm, motor holder Mh and gear arrangement according to the existing structure. The insertion/ejection mechanism includes an insertion mechanism for placing a recording disk into a predetermined position of the electronic apparatus 1 and an ejection mechanism for ejecting a recording disk from the predetermined position. The insertion/ejection mechanism includes the loading motor 15 as a drive source, a gear train 17 and the motor holder 16. The motor holder 16 has a holder body 16a supporting the loading motor 15, a first bracket 16b extending from one end of the holder body 16a and fixing an axis position P1 of a gear 17a meshing with a not-shown pinion gear of the loading motor 15, and a second bracket 16c extending from the other end of the holder body 16a and pressing a part of an axis of the gear train 17.

The loading motor 15 is designed greater in rating output than the loading motor Lm of the existing structure. This can reduce the speed-reduction ratio of the gear train 17 rather than that of the existing structure, thus enabling to reduce the motor rotational rate. Because the motor holder 16 particularly has the first bracket 16b fixing the axis position P1 of the gear 17a meshing with the pinion gear of the loading motor 15, the error of mesh can be suppressed to reduce vibrations. In other words, the motor holder 16 can be improved in rigidity and reduced in vibrations. In this manner, the electronic apparatus 1 can be improved in quality. Specifically, the existing structure has an insertion/ejection speed of "3 seconds" whereas the insertion/ejection mechanism in this embodiment can reduce the insertion/ejection speed down to "2 seconds". The existing structure has an insertion/ejection noise (Typ value) of 55 dBA whereas the insertion/ejection noise (Typ value) can be reduced down to 45 dBA.

Figure 9B:
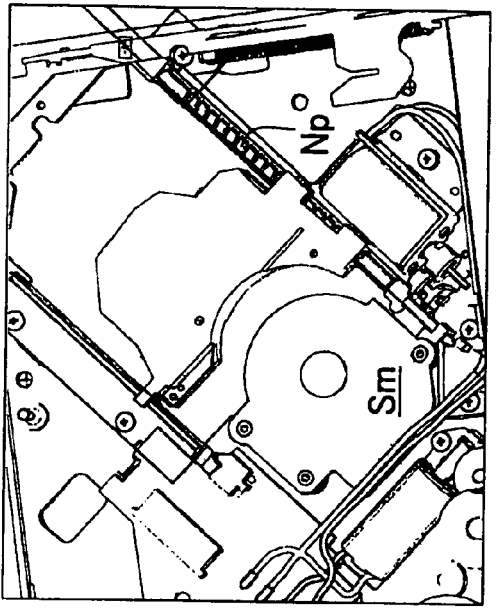
Figure 9D:
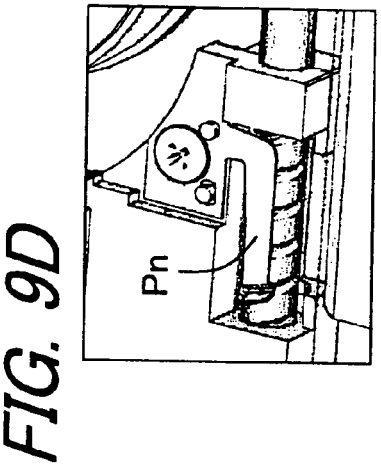
Figure 9A:
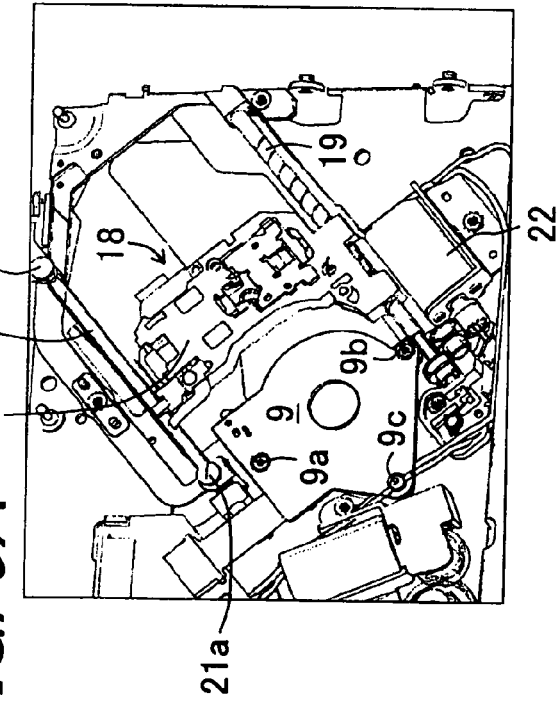
Figure 9C:
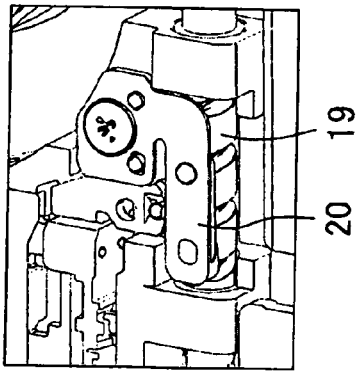

FIGS. 9A, 9B, 9C and 9D are views showing a comparison between the feed mechanisms and skew adjustment mechanisms for the optical pickups, wherein FIGS. 9A and 9C are views showing a feed mechanism and skew adjustment mechanism according to the present embodiment while FIGS. 9B and 9D are a view showing a feed mechanism and skew adjustment mechanism according to the existing structure. The electronic apparatus 1 includes an optical pickup 18 as an electronic component to reproduce the information recorded on a recording disk, a feed mechanism and skew adjustment mechanism for the same.

The feed mechanism as a drive mechanism includes a feed screw 19, a feed female screw 20 in mesh with the feed screw 19 and formed of resin, and a slide rail 21. The feed screw 19 extends radially while the slide rail is arranged parallel with the feed screw 19 and spaced a predetermined small distance therefrom. The optical pickup 18 at its pickup body frame 18a is supported by the feed screw 19 and the slide rail 21. The feed screw 19 is provided to be rotated by a thread motor 22 as a rotational drive source for the optical pickup 18. The feed screw 19 has a feed-screw pitch given greater than that Np of the existing structure. In other words, the feed screw 19 is structured with a feed-screw pitch capable of reducing the motor rotational rate of the thread motor 22.

The rotational rate of the thread motor 22 can be reduced by the feed screw 19, thus lowering noise rather than that in the existing art. The feed female screw 20, meshing with the feed screw 19, is formed of resin and hence can be raised in dimensional accuracy as compared to the existing feed female screw Pn formed by pressing, thus making it possible to place the feed screw 19 and the feed female screw 20 in mesh on a pitch line. Accordingly, search noise can be reduced rather than in the existing art.

The skew adjustment mechanism is now explained. As shown in FIG. 9A, the spindle motor 9 is structured in such a manner that an inclination angle thereof relative to a recording disk can be adjusted by an adjustment rod 9c with reference to support rods 9a, 9b. The slide rail 21, radially extending, has lengthwise one end structured to be able to adjust its position 21a with respect to the z direction, and the lengthwise other end structured to be able to adjust its position 21b with respect to the z direction. In other words, in the skew adjustment mechanism of this embodiment, by adjusting the inclination angle of the spindle motor 9, skew adjustment accuracy can be improved for an inner peripheral portion of a recording disk. Moreover, by adjusting the inclination angle of the slide rail 21 of the feed mechanism, skew adjustment accuracy can be improved for an outer peripheral portion of the recording disk.

Accordingly, skew adjustment accuracy can be improved over the optical pickup 18 entirety. After building the optical pickup 18 in the chassis body 4 of the electronic apparatus 1, skew adjustment can be carried out at the inner and outer peripheral portions of the recording disk, thus improving the accuracy and simplification of assembling. Adjustment is possible at three points on the skew adjustment mechanism in this embodiment as shown in FIG. 9A whereas adjustment is possible at two points of the spindle motor Sm in the skew adjustment mechanism of the existing structure as shown in FIG. 9B. In the present embodiment, after skew adjustment, adjustment points are firmly fixed by use of an UV adhesive. On the contrary, in the existing structure, after skew adjustment, adjustment points are firmly fixed by using screw locking. In the skew adjustment mechanism in the present embodiment using an UV adhesive, vibration resistance can be improved rather than in the existing structure using screw locking.

Figure 10:
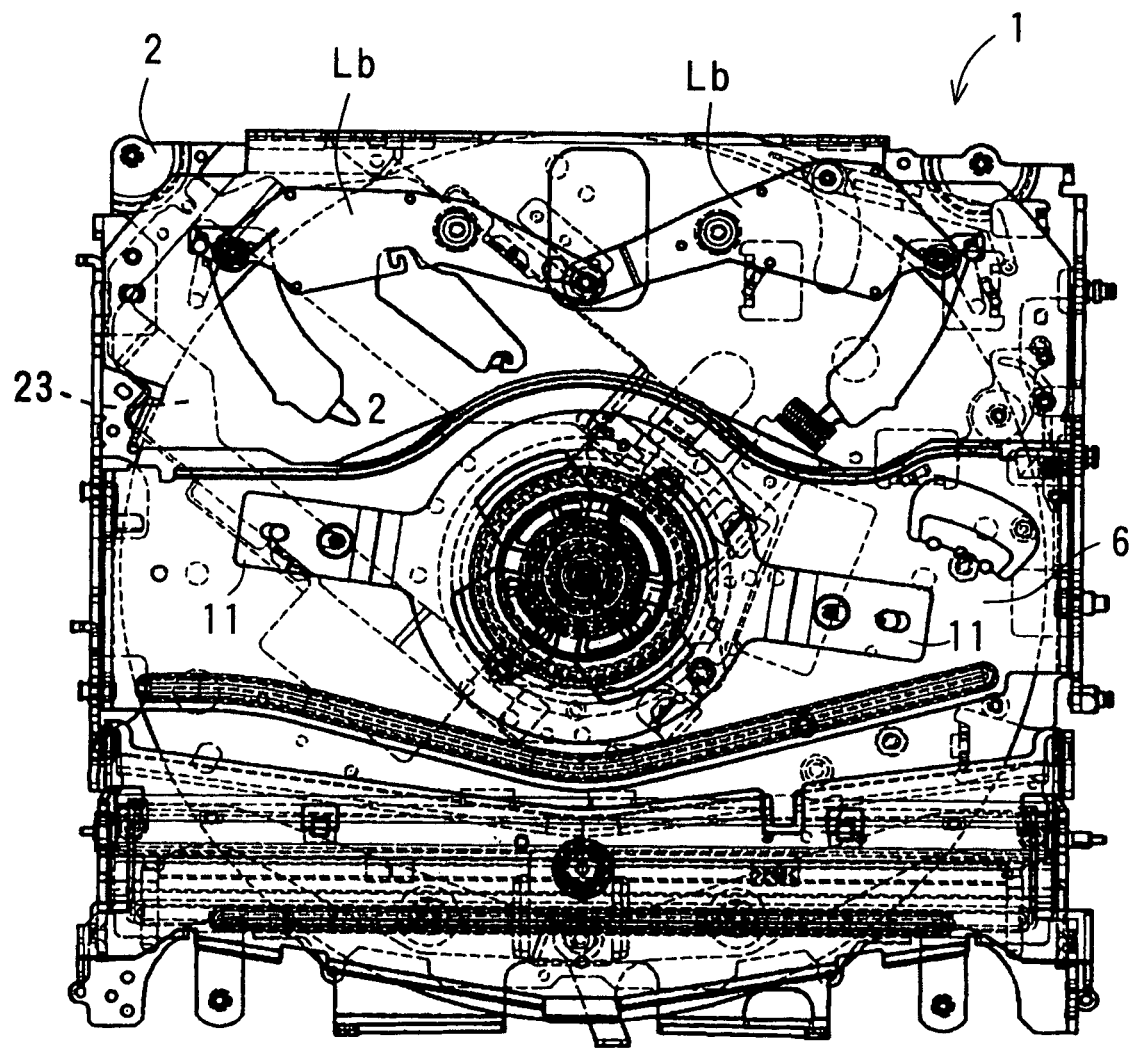
FIG. 10 is a view showing an arrangement position, etc. of a flexible cover in the electronic apparatus.
Figure 11:
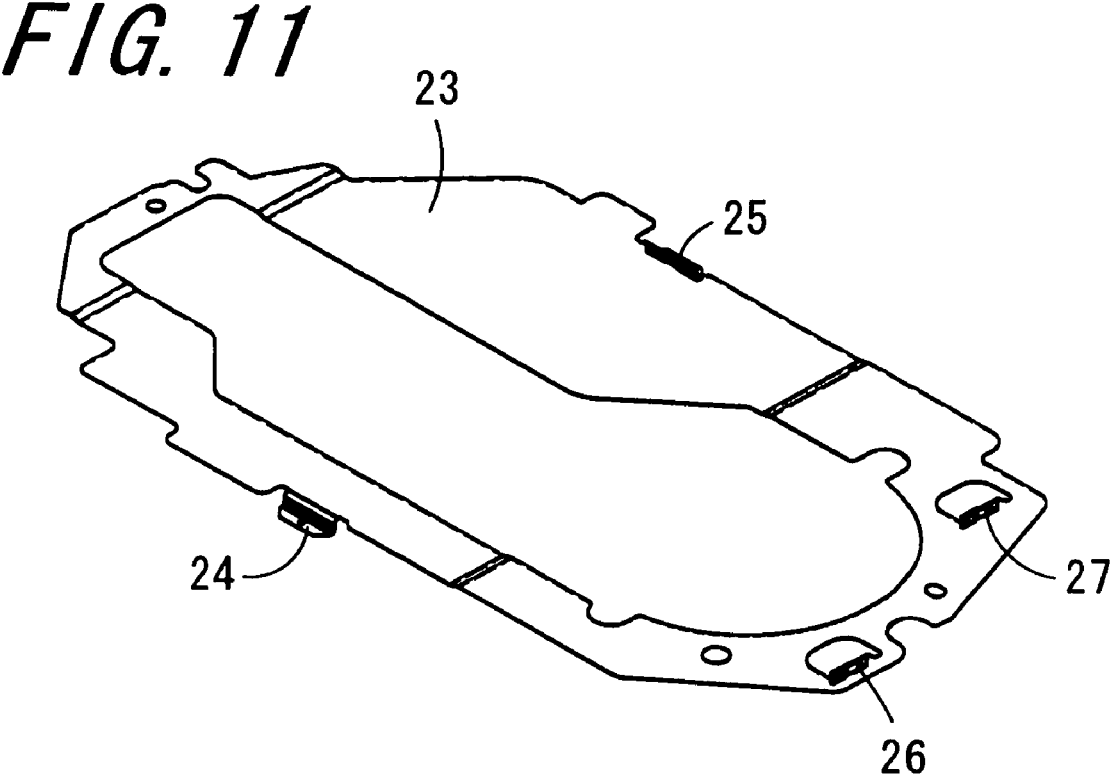
FIG. 11 is a perspective view of the flexible cover.
Figure 12:
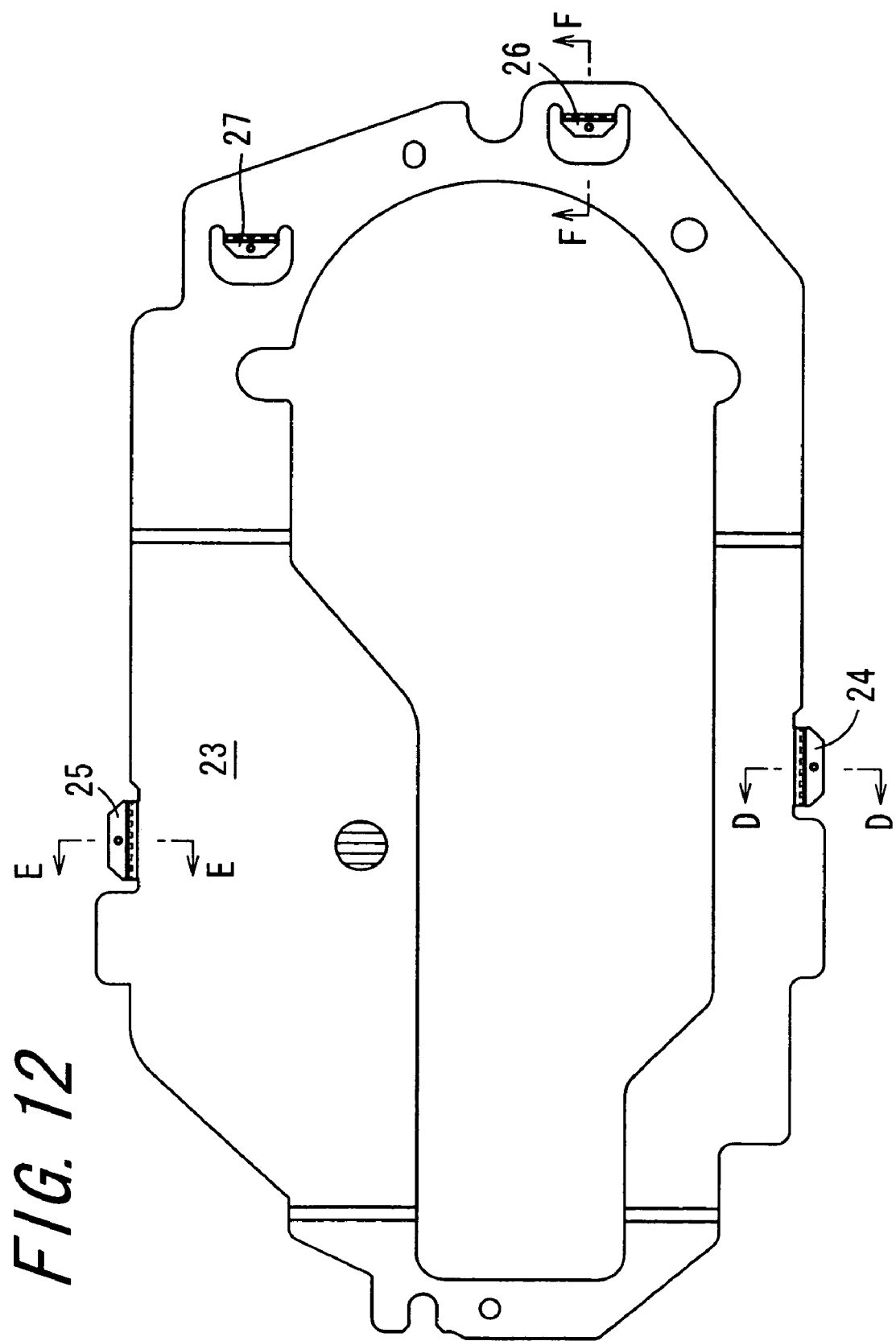
FIG. 12 is a front view of the flexible cover.
Figure 13:
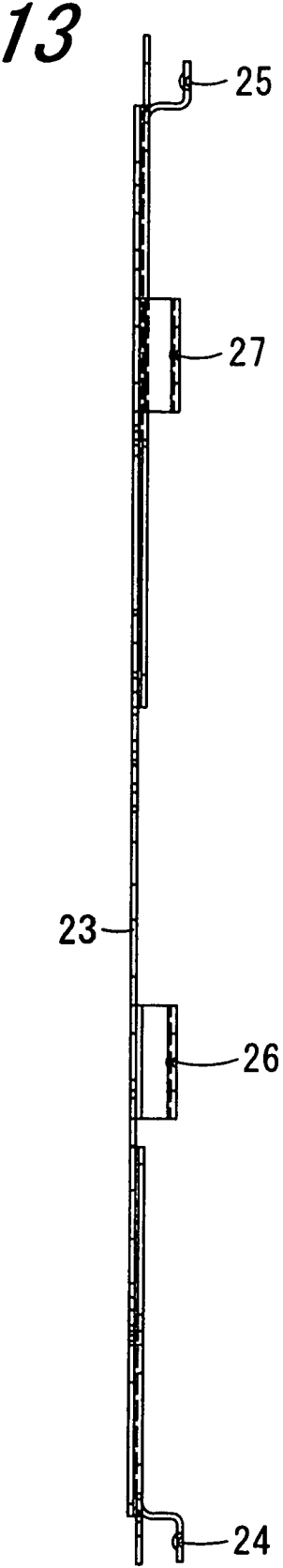
FIG. 13 is a side view of the flexible cover.
Figure 14:
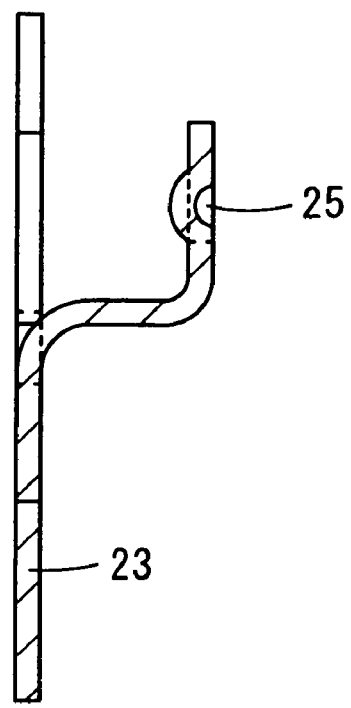
FIG. 14 shows an essential part where the flexible cover is to be removably attached, which is a sectional view taken along line E-E in FIG. 12.
Figure 15:
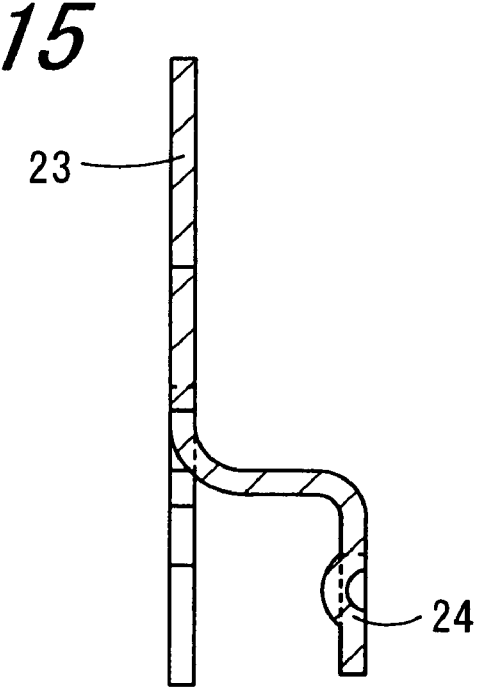
FIG. 15 shows an essential part where the flexible cover is to be removably attached, which is a sectional view taken along line D-D in FIG. 12.
Figure 16:
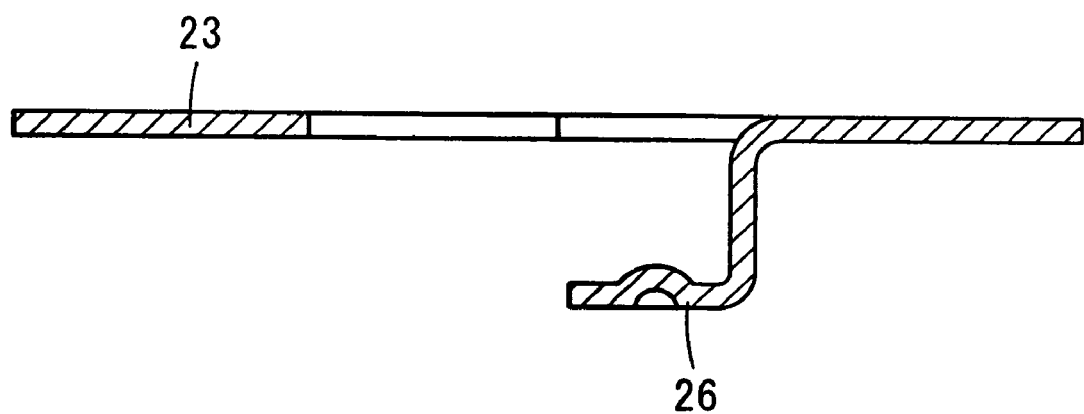
FIG. 16 shows an essential part where the flexible cover is to be removably attached, which is a sectional view taken along line F-F in FIG. 12.

FIG. 10 is a view showing an arrangement position, etc. of a flexible cover 23 in the electronic apparatus. FIG. 11 is a perspective view of the flexible cover 23, FIG. 12 is a front view of the flexible cover 23, and FIG. 13 is a side view of the flexible cover 23. FIG. 14 shows an essential part where the flexible cover 23 is to be removably attached, which is a sectional view taken along line E-E in FIG. 12. FIG. 15 shows an essential part where the flexible cover 23 is to be removably attached, which is a sectional view taken along line D-D in FIG. 12. FIG. 16 shows an essential part where the flexible cover 23 is to be removably attached, which is a sectional view taken along line F-F in FIG. 12.

On the chassis body 4, the flexible cover 23 is provided covering at least the feed mechanism for the optical pickup 18. The flexible cover 23 is provided particularly in order to prevent the grease applied to the feed screw 19 from scattering. The flexible cover 23 as a cover member has a plurality of engaging points 24, 25, 26, 27, and to be removably attached on the chassis body 4 through the engaging points 24 to 27. Although the flexible cover 23 in this embodiment is removably attached to the chassis body 4, there is a possible case to removably provide a flexible cover 23 to the chassis body 4 and to the optical pickup 18 as an electronic component. In such a case, effects are enjoyed similarly to the present embodiment.

Because the flexible cover 23 is removably attached on the chassis body 4, lubricant such as grease can be prevented from scattering. Besides, in the event a trouble occurs in the flexible cover 23 (e.g. a trouble of elastic deformation due to pressing), the flexible cover 23 only can be exchanged easily and swiftly. Accordingly, there is eliminated the case to damp the electronic apparatus resulting from a trouble of the flexible cover 23, thus improving the yield.

Figure 17:
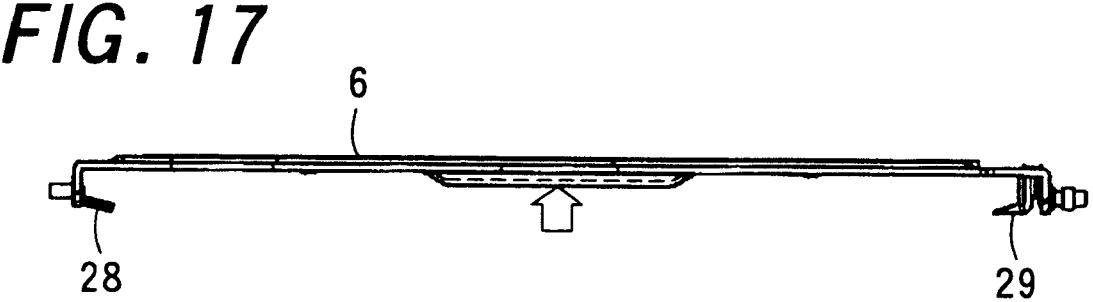
FIG. 17 is a plan view of the clamp holder, etc.
Figure 18:
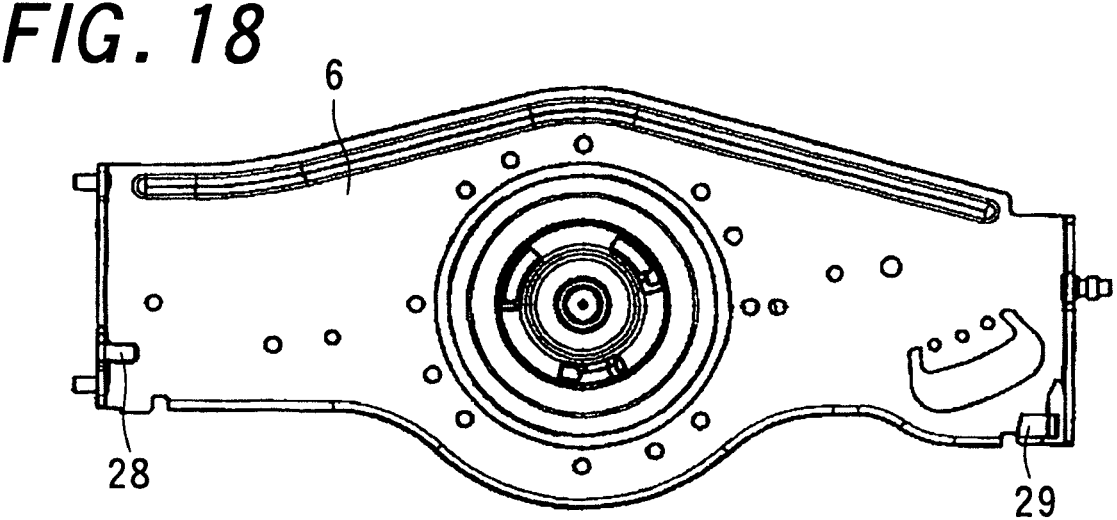
FIG. 18 is a front view of the clamp holder, etc.
Figure 19:
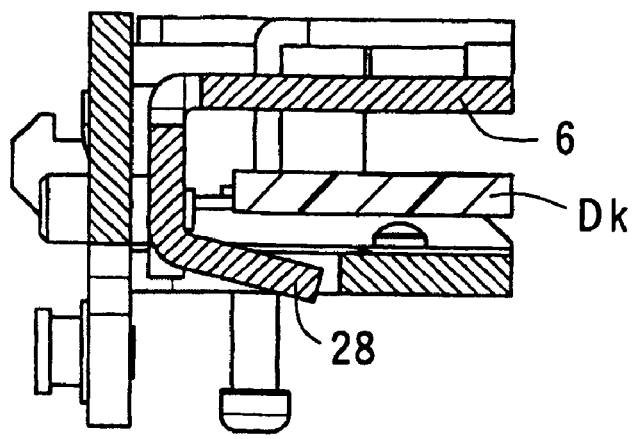
FIG. 19 is an essential-part sectional view of one detaching means for removing a recording disk from the drive part.
Figure 20:
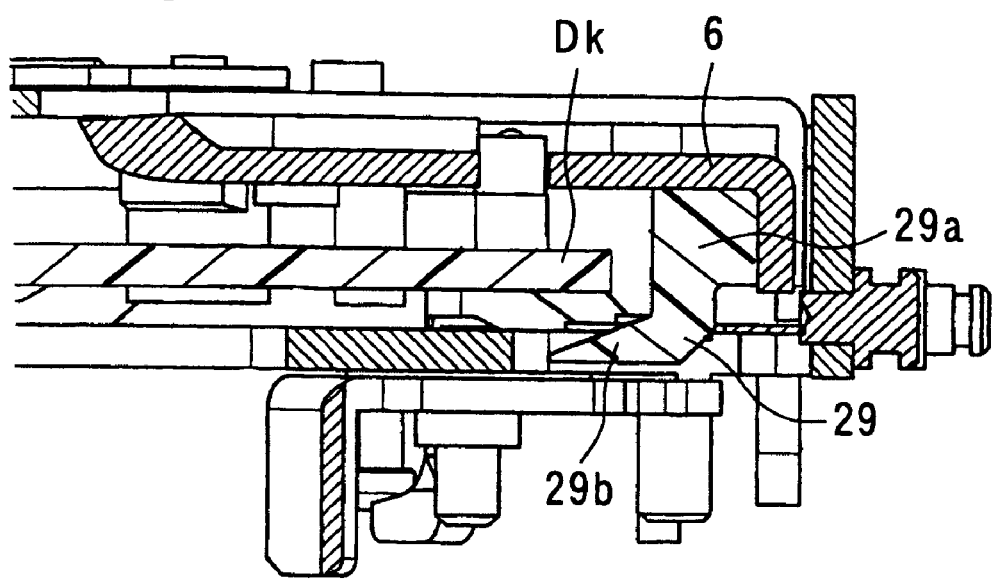
FIG. 20 is an essential-part sectional view of the other detaching means for removing a recording disk from the drive part.

FIG. 17 is a plan view of the clamp holder 6, etc. while FIG. 18 is a front view of the clamp holder 6, etc. FIG. 19 is an essential-part sectional view of one detaching means 28 for removing a recording disk Dk from the drive part 10. FIG. 20 is an essential-part sectional view of the other detaching means 29 for removing a recording disk Dk from the drive part 10. The clamp holder 6 is provided with the detaching means 28, 29 in a pair for removing the recording disk Dk from the drive part 10. The one pair of detaching means 28, 29 are arranged in positions nearly symmetric (or may be symmetric) about the axis of the drive part 10. The one detaching means 28 is formed integral with the clamp holder 6 as shown in FIG. 19, and formed in a slant form becoming distant from the recording disk Dk toward inside in a radial direction of the recording disk Dk.

The other detaching means 29 is formed, say, of synthetic resin separately from the clamp holder, as shown in FIG. 20. The other detaching means 29 is screw-fastened, say, to the clamp holder 6, thus including a detaching holder portion 29a formed along a side wall of the clamp holder 6 and a slant portion 29b formed slant at a tip of the detaching holder portion 29a in a manner becoming distant from the recording disk Dk toward inside in the radial direction. The recording disk Dk is to abut against the slant portion 29b and the one detaching means 28.

Because the one pair of detaching means 28, 29 explained in the above are arranged in positions nearly symmetric about the axis of the drive part 10, the recording disk Dk when removed from the drive part 10 can be detached smoothly from the drive part 10 without inclining the recording disk Dk relative to the clamp holder 6. Even where the recording disk Dk is held tight on the drive part 10, the recording disk Dk can be removed from the drive part 10 smoothly and positively.

Figure 21:
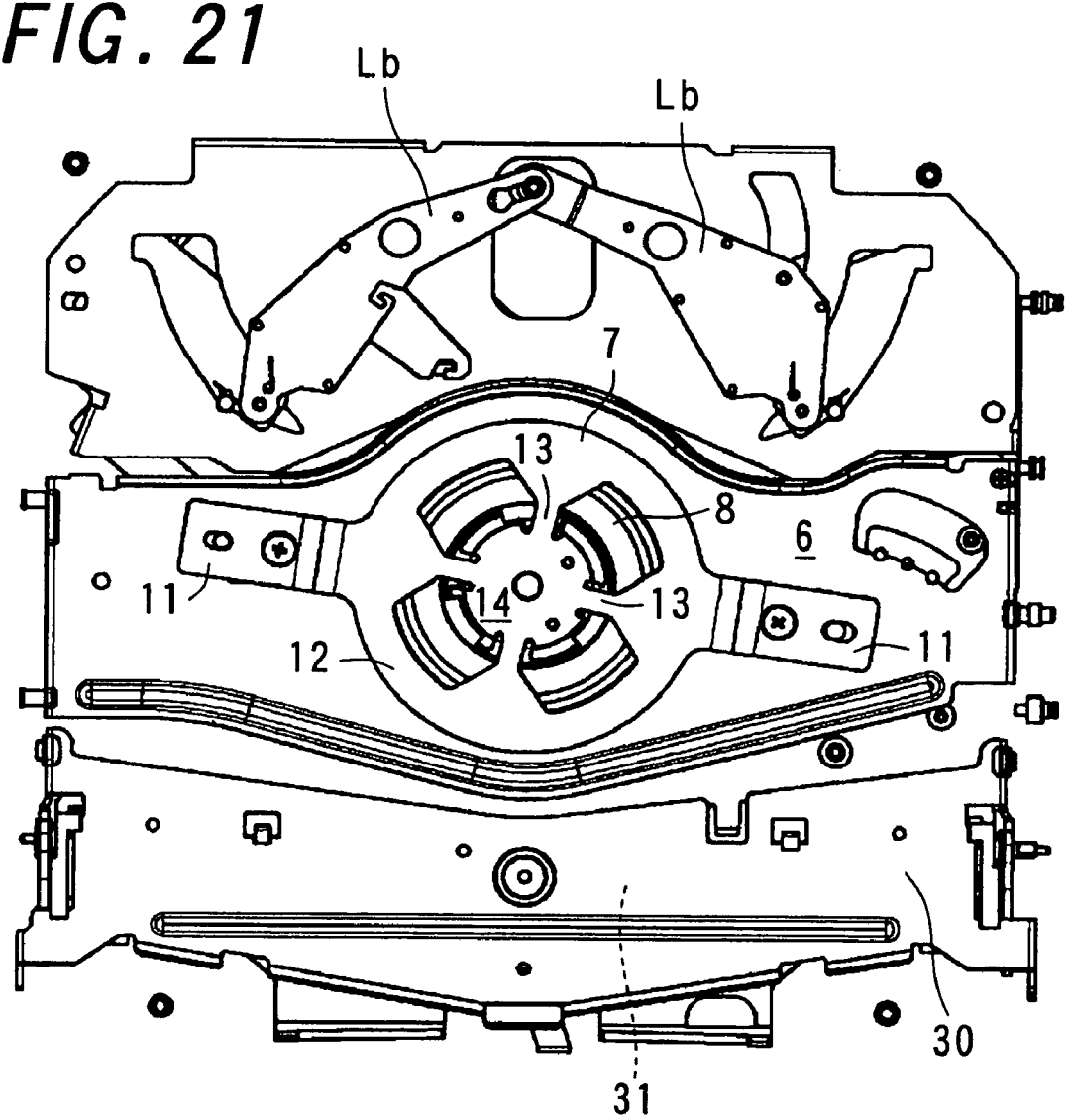
FIG. 21 is a view showing a relationship between detecting levers, the clamp holder and a guide holder.
Figure 22:
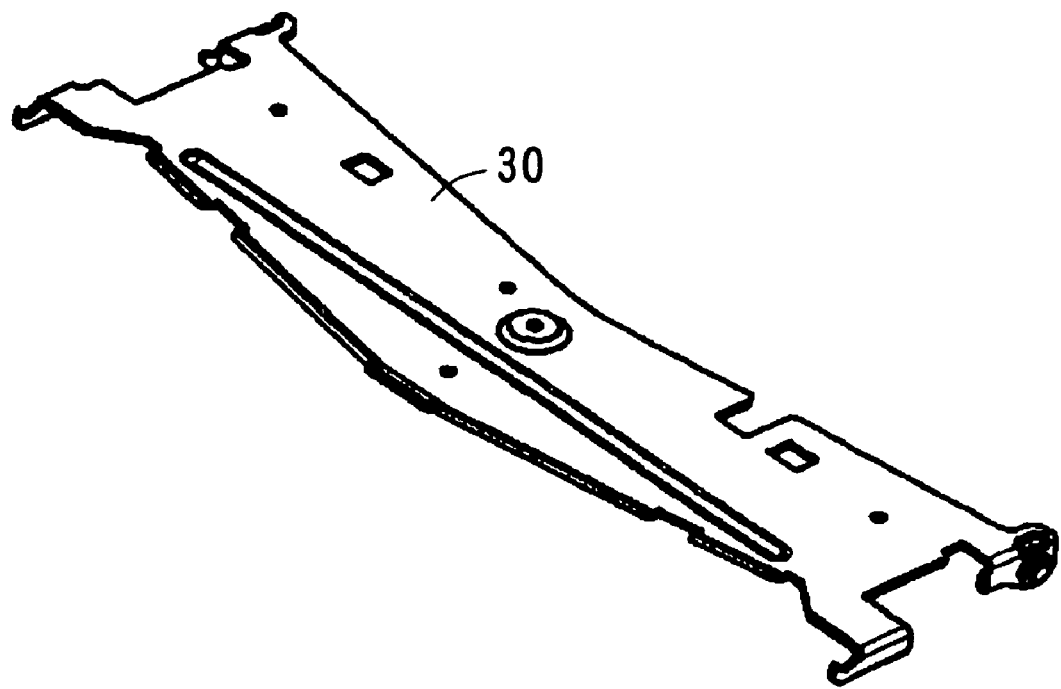
FIG. 22 is a perspective view of the guide holder.
Figure 23:
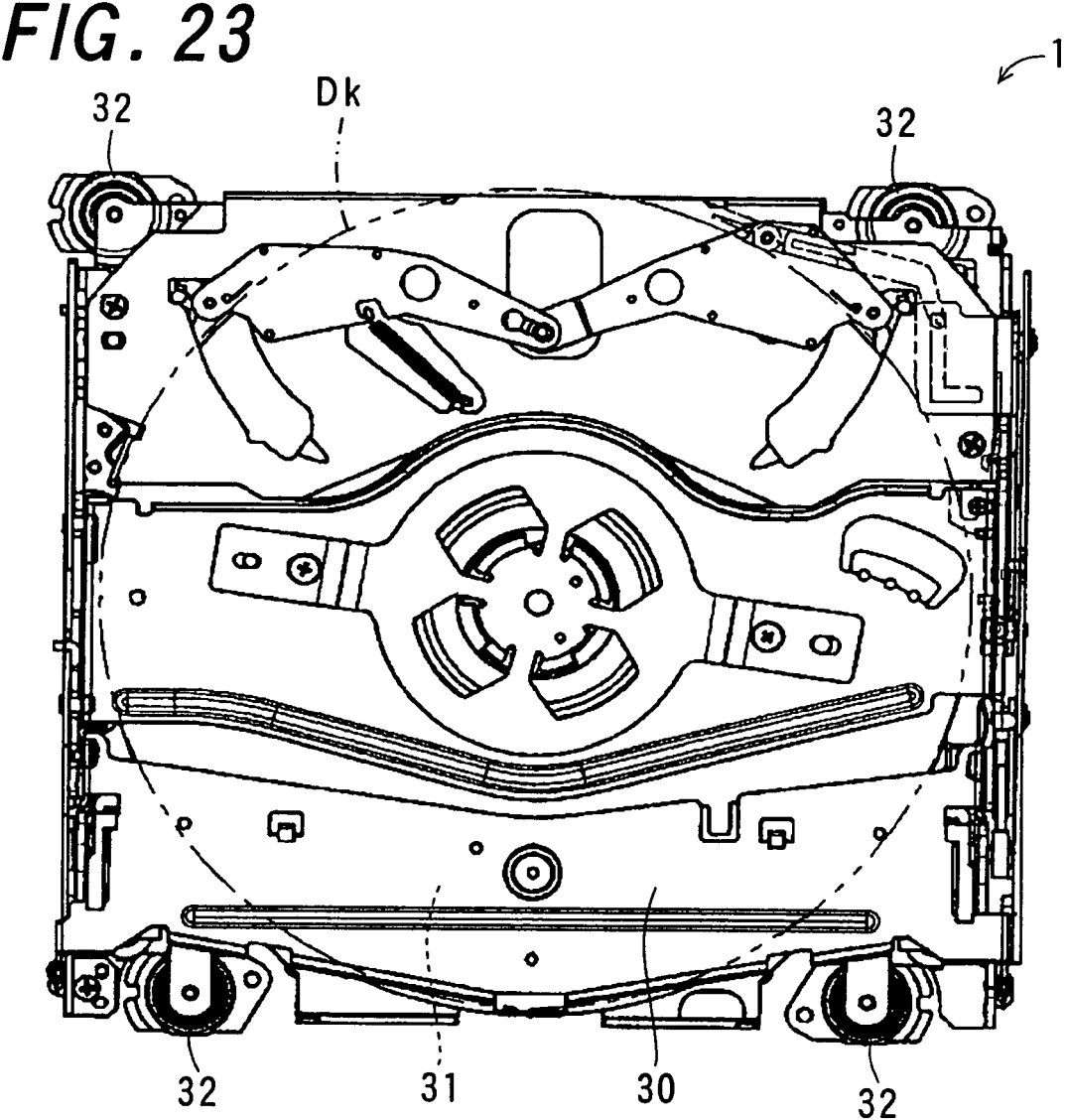
FIG. 23 is a view showing a relationship between the recording disk and the guide holder, etc.
Figure 24:
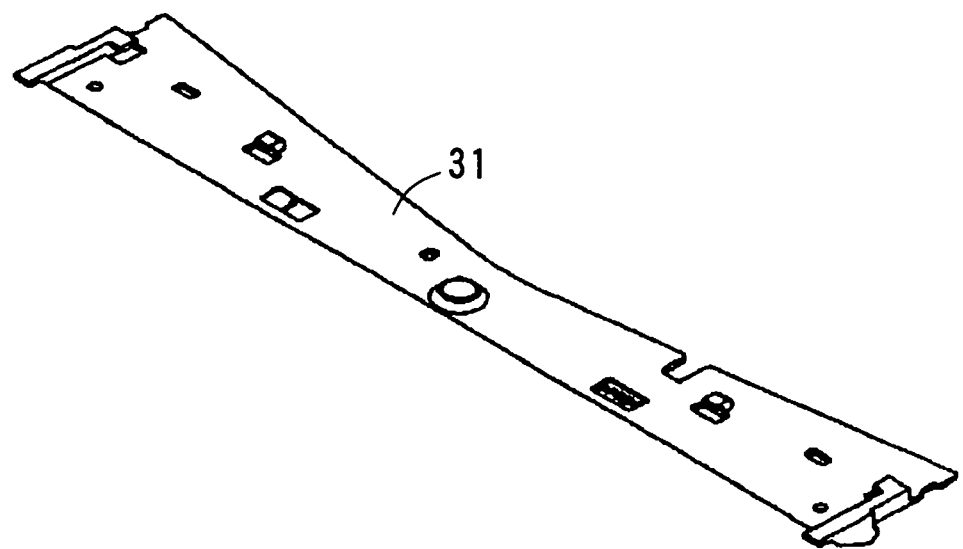
FIG. 24 is a perspective view of a spacer as viewed from one side.
Figure 25:
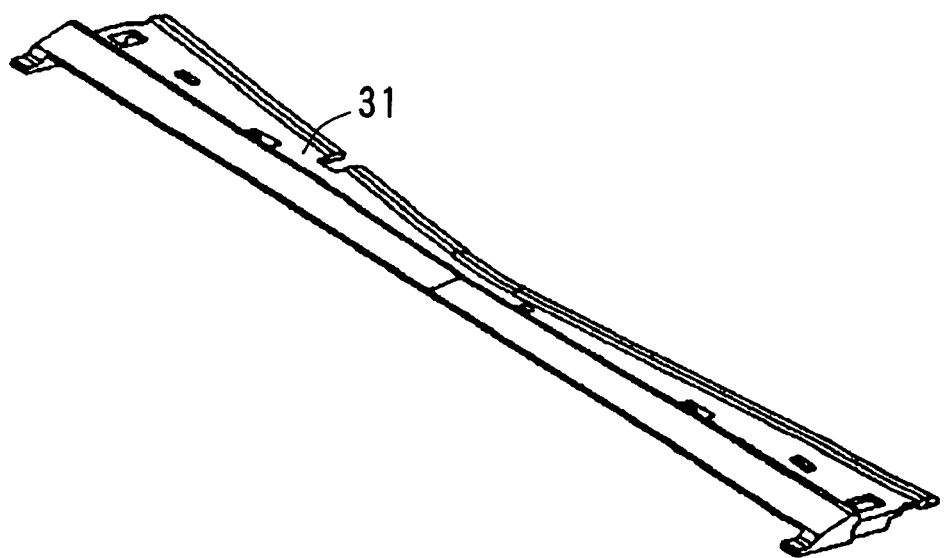
FIG. 25 is a perspective view of the spacer as viewed from the other side.

FIG. 21 is a view showing a relationship between detecting levers Lb, the clamp holder 6 and a guide holder 30. FIG. 22 is a perspective view of the guide holder 30. FIG. 23 is a view showing a relationship between the recording disk Dk and the guide holder 30, etc. FIG. 24 is a perspective view of a spacer 31 as viewed from one side while FIG. 25 is a perspective view of the spacer 31 as viewed from the other side. The electronic apparatus 1 has a guide holder 30 for inserting and ejecting the recording disk Dk and a spacer 31 which is formed of resin and removably disposed on the guide holder 30. The spacer 31 is made in a snap-fit structure allowing a deformation due to a difference in thermal expansion coefficient from the guide holder 30.

The spacer 31 is formed of resin and removably disposed on the guide holder 30. Namely, because the spacer 31 is provided separate from the guide holder 30, metal-die cost can be reduced. Accordingly, manufacture cost can be reduced for the electronic apparatus 1. In addition, the spacer 31 can be easily design-changed thus making it possible to easily exchange the spacer 31 for the guide holder 30.

Because the spacer 31 is made in a snap-fit structure allowing a deformation due to a difference in thermal expansion coefficient from the guide holder 30, assembling can be simplified as compared to the structure using tightening elements, such as bolts and nuts. Particularly, because the spacer 31 allows a deformation due to a difference in thermal expansion coefficient from the guide holder 30, thermal resistance can be improved. Accordingly, the temperature conditions the guide holder 30 and the spacer 31 are applicable can be provided strict, thus enhancing the versatility and endurance.

Figure 26A:
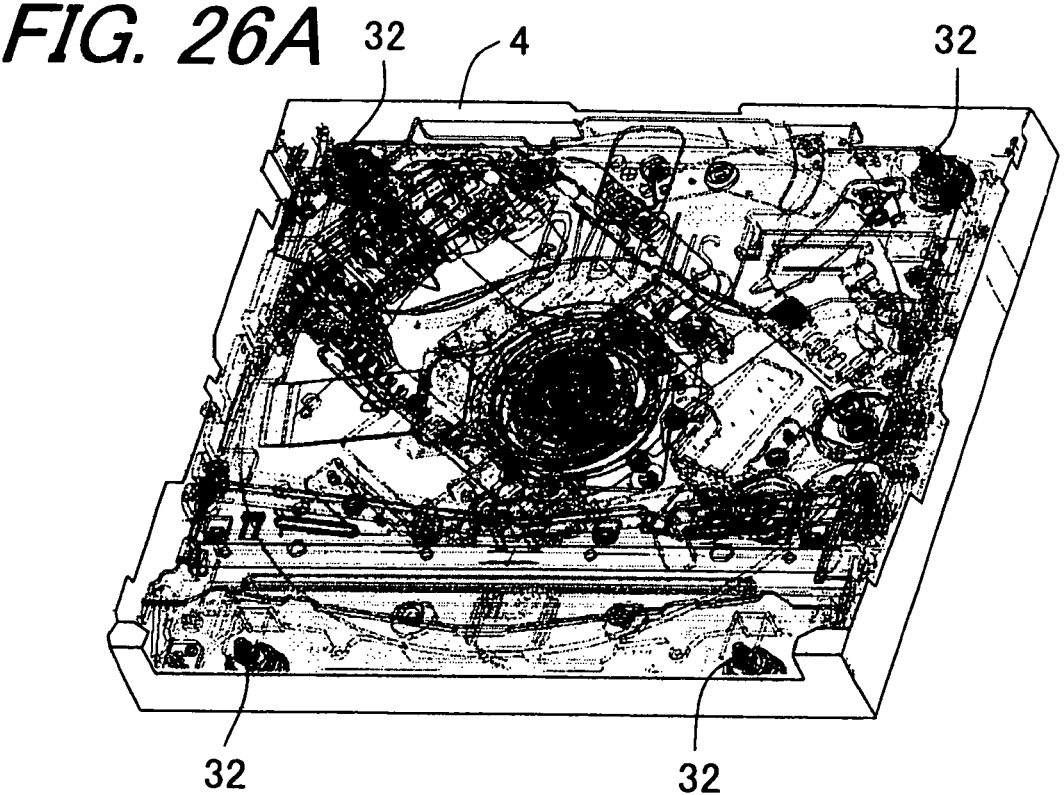
Figure 26B:
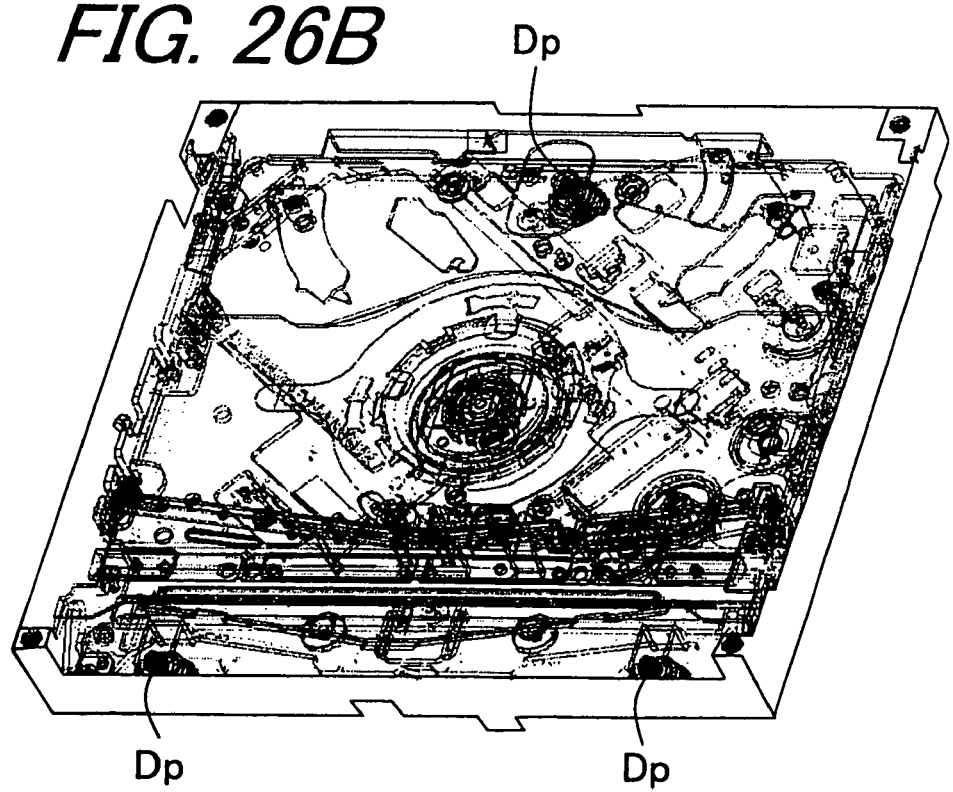
Figure 27B:
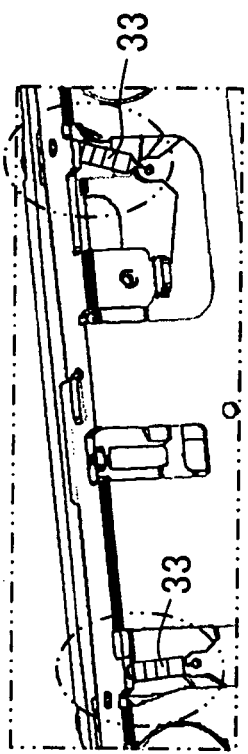
Figure 27C:
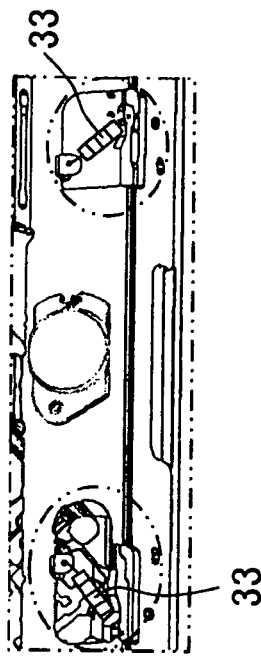
Figure 27A:
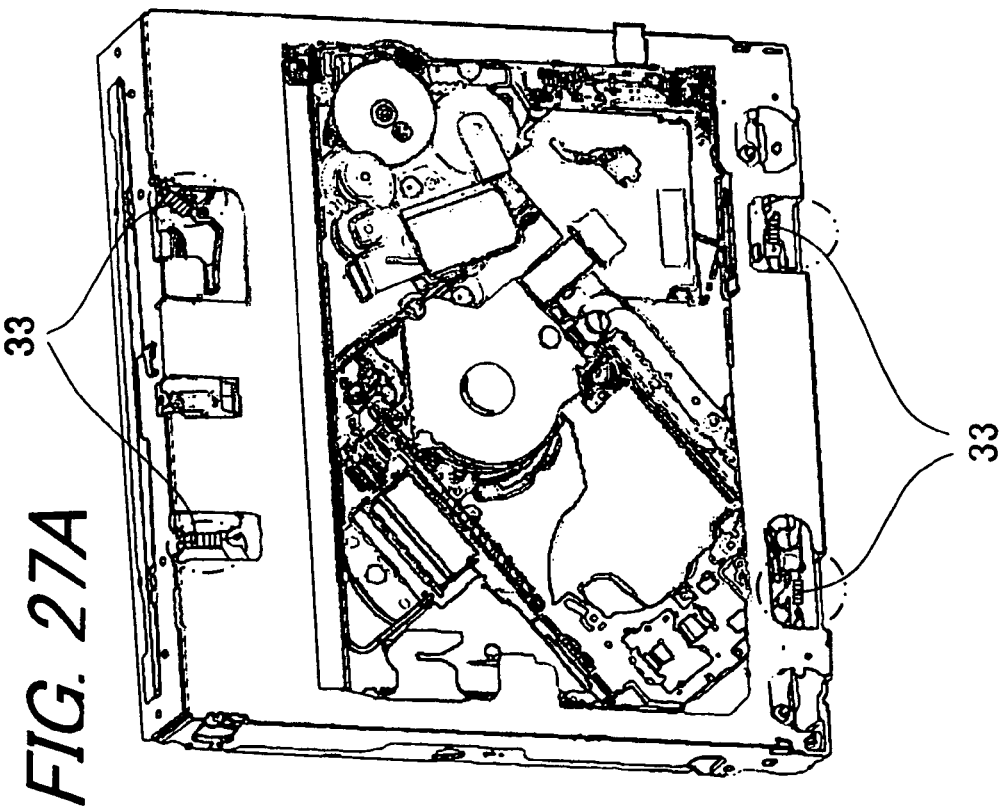

FIGS. 26A and 26B show an anti-vibration structure in the electronic apparatus, wherein FIG. 26A shows an anti-vibration structure according to the present embodiment having four oil dampers 32 on the chassis body 4 while FIG. 26B shows an anti-vibration structure according to the existing structure having three oil dampers Dp on the chassis body. FIGS. 27A, 27B and 27C are views showing a state having floating springs 33 at four points, wherein FIGS. 27B and 27C are enlarged views respectively of a portion shown in FIG. 27A. In this embodiment, by employing an anti-vibration structure having the four oil dampers 32, the electronic apparatus 1 can be coped with vertical positioning wherein vibration resistance can be improved. Its anti-vibration dampers can be improved against breakage in comparison with the existing structure thus improving the balance in the vertical positioning of the electronic apparatus 1. The invention may be embodied in other specific forms without departing from the spirit or essential characteristics thereof.

The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A disk reproducing apparatus comprising:
   a clamper which is elastically deformable and presses a disk against a turntable; and
   a clamp plate composed of a fixed portion fixed to a clamp holder, a contact portion, located in a central axis thereof, in contact with the clamper, and a connection portion which is elastically deformable and connects the fixed portion and the contact portion, and a pair of brackets,
   wherein the fixed portion is located radially around the central axis,
   wherein the clamp plate is supported on the clamp holder by the pair of brackets,
   wherein the fixed portion and the pair of brackets are integrally formed, and wherein one of the pair of brackets extends in one direction from the fixed portion and the other one of the pair of brackets extends in the opposite direction from the fixed portion.

2. The disk reproducing apparatus of claim 1,
wherein the connection portion radially extends from the contact portion to the fixed portion.

3. The disk reproducing apparatus of claim 1,
wherein the clamper is formed of a flexible material so as to have a circular shape, and is provided with an annular slant wall portion formed so as to be closer to the turntable from inside to outside in a radial direction of the clamper, and a deflection amount of the clamper relative to the clamp holder is determined depending upon a thickness of the slant wall portion.

4. The disk reproducing apparatus of claim 1,
wherein the clamp holder is provided with a pair of detaching device which detaches a recording disk from the turntable and which are arranged in positions symmetric or nearly symmetric about an axis of the turntable.

5. The disk reproducing apparatus of claim 1, further comprising:
a chassis body which houses electronic components; and
a chassis cover for covering the chassis body,
wherein the chassis cover has a reinforcing rib which is disposed on the chassis cover at a lengthwise intermediate portion of its outer peripheral edge and can be engaged with the chassis body.

6. The disk reproducing apparatus of claim 5, further comprising a drive mechanism for driving an optical pickup apparatus,
wherein the driving mechanism includes:
a feed screw which is structured with a feed-screw pitch capable of reducing a rotational rate of a rotational drive source; and
a feed female screw which is in mesh with the feed screw and formed of resin.

7. The disk reproducing apparatus of claim 6,
wherein a cover member is removably disposed in a vicinity of the feed screw in at least one of the chassis body and the electronic component.

8. The disk reproducing apparatus of claim 6,
wherein the rotational drive source and the driving mechanism are structured so that their inclination angles relative to a recording disk can be adjusted, respectively.

9. The disk reproducing apparatus of claim 7, further comprising:
a guide holder for inserting and ejecting the recording disk; and
a spacer formed of resin, which is removably disposed on the guide holder.

10. The disk reproducing apparatus of claim 9,
wherein the spacer is made in a snap-fit structure allowing a deformation due to a difference in thermal expansion coefficient from the guide holder.

11. The disk reproducing apparatus of claim 2,
wherein the clamper is formed of a flexible material so as to have a circular shape, and is provided with an annular slant wall portion formed so as to be closer to the turntable from inside to outside in a radial direction of the clamper, and a deflection amount of the clamper relative to the clamp holder is determined depending upon a thickness of the slant wall portion.

12. The disk reproducing apparatus of claim 7,
wherein the rotational drive source and the driving mechanism are structured so that their inclination angles relative to a recording disk can be adjusted, respectively.

13. The disk reproducing apparatus of claim 1, wherein the connection portion is continuously provided radially extending from the contact portion toward the fixed portion.

* * * * *